United States Patent [19]

Ishiwata et al.

[11] Patent Number: 5,894,312
[45] Date of Patent: Apr. 13, 1999

US005894312A

[54] IMAGE PROCESSING APPARATUS FOR PROCESSING DIGITAL SIGNALS

[75] Inventors: Masahiro Ishiwata; Takeshi Suda. both of Ebina, Japan

[73] Assignee: Fuji Xerox Co., Ltd., Tokyo, Japan

[21] Appl. No.: 08/851,031

[22] Filed: May 5, 1997

[30] Foreign Application Priority Data

May 8, 1996 [JP] Japan ................................. 8-114023

[51] Int. Cl.$^6$ ................................................. G06F 15/16
[52] U.S. Cl. ....................... 345/504; 345/508; 345/521; 345/526
[58] Field of Search ........................... 345/501–504, 345/507–509, 521, 526, 418, 473; 711/5, 100

[56] References Cited

U.S. PATENT DOCUMENTS 5,392,394  2/1995  Hamana ........................... 345/504

5,781,201  7/1998  McCormack et al. ............... 345/509

FOREIGN PATENT DOCUMENTS

A-2-137040  5/1990  Japan.
B2 6-93244  11/1994  Japan.

Primary Examiner—Kee M. Tung
Attorney, Agent, or Firm—Oliff & Berridge, PLC

[57] ABSTRACT

An image processing apparatus is disclosed which is connected to external machines for inputting data therefrom to a plurality of image memories and outputting data from the plurality of image memories thereto. The image processing apparatus includes a plurality of memory access controllers connected to the plurality of image memories, and a control device for selecting, a first mode for the plurality of memory access controllers to access the image memories separately, or a second mode for a master controller, which is one of the memory access controllers, to access the plurality of image memories as one image memory space so a to control the plurality of memory access controllers.

16 Claims, 18 Drawing Sheets

FIG. 19

| RW | ROT (1) | ROT (0) | XMIR | YMIR | DESTINATION INITIAL ADDRESS | FIGURE |
|---|---|---|---|---|---|---|
| 0 | 0 | 0 | 0 | 0 | A' | FIG. 11 (A) |
| 0 | 0 | 0 | 1 | 0 | B' | FIG. 11 (B) |
| 0 | 0 | 0 | 0 | 1 | C' | FIG. 11 (C) |
| 0 | 0 | 0 | 1 | 1 | D' | FIG. 11 (D) |
| 0 | 0 | 1 | 0 | 0 | B' | FIG. 12 (A) |
| 0 | 0 | 1 | 1 | 0 | A' | FIG. 12 (B) |
| 0 | 0 | 1 | 0 | 1 | C' | FIG. 12 (C) |
| 0 | 0 | 1 | 1 | 1 | D' | FIG. 12 (D) |
| 0 | 1 | 0 | 0 | 0 | D' | FIG. 13 (A) |
| 0 | 1 | 0 | 1 | 0 | C' | FIG. 13 (B) |
| 0 | 1 | 0 | 0 | 1 | B' | FIG. 13 (C) |
| 0 | 1 | 0 | 1 | 1 | A' | FIG. 13 (D) |
| 0 | 1 | 1 | 0 | 0 | C' | FIG. 14 (A) |
| 0 | 1 | 1 | 1 | 0 | D' | FIG. 14 (B) |
| 0 | 1 | 1 | 0 | 1 | A' | FIG. 14 (C) |
| 0 | 1 | 1 | 1 | 1 | B' | FIG. 14 (D) |
| 1 | 0 | 0 | 0 | 0 | A' | FIG. 15 (A) |
| 1 | 0 | 0 | 1 | 0 | B' | FIG. 15 (B) |
| 1 | 0 | 0 | 0 | 1 | C' | FIG. 15 (C) |
| 1 | 0 | 0 | 1 | 1 | D' | FIG. 15 (D) |
| 1 | 0 | 1 | 0 | 0 | C' | FIG. 16 (A) |
| 1 | 0 | 1 | 1 | 0 | A' | FIG. 16 (B) |
| 1 | 0 | 1 | 0 | 1 | D' | FIG. 16 (C) |
| 1 | 0 | 1 | 1 | 1 | B' | FIG. 16 (D) |
| 1 | 1 | 0 | 0 | 0 | D' | FIG. 17 (A) |
| 1 | 1 | 0 | 1 | 0 | C' | FIG. 17 (B) |
| 1 | 1 | 0 | 0 | 1 | B' | FIG. 17 (C) |
| 1 | 1 | 0 | 1 | 1 | A' | FIG. 17 (D) |
| 1 | 1 | 1 | 0 | 0 | B' | FIG. 18 (A) |
| 1 | 1 | 1 | 1 | 0 | D' | FIG. 18 (B) |
| 1 | 1 | 1 | 0 | 1 | A' | FIG. 18 (C) |
| 1 | 1 | 1 | 1 | 1 | C' | FIG. 18 (D) |

IMAGE PROCESSING APPARATUS FOR PROCESSING DIGITAL SIGNALS

BACKGROUND OF THE INVENTION

This invention relates to an image processing apparatus being connected to a host computer and an external machine such as a copier, a scanner, or a printer for writing image data from the host computer or external machine into a memory of the image processing apparatus and outputting the once written data to the host computer or external machine.

In recent years, a system has been constructed wherein an engineering subsystem (ESS) is connected between a host computer and an external machine such as a copier, a scanner, or a printer for outputting a computer graphics image, etc., prepared by the host computer to the copier, printer, etc., and outputting image data read through the scanner, copier, etc., to a CRT of the host computer. If a network like a LAN (local area network) is used, a number of external machines can be connected and a wide area system can be constructed.

To output image data transferred from the host computer to the external machine such as a copier or printer in such a system, a process of writing the image data transferred from the host computer into an image memory in the ESS, then reading the image data from the image memory and transferring the image data to a predetermined external machine is required.

To output image data read through the scanner, copier, etc., to the CRT of the host computer, a process of writing the image data read through the scanner, copier, etc., into the image memory in the ESS, then reading the image data from the image memory and transferring the image data to the host computer is required.

The conventional system having the function as described above cannot output an image transferred from the host computer, for example, to a number of external machines at the same time. Thus, to output the same image data to a number of external machines, a process of writing the image data transferred from the host computer into the image memory in the ESS, then reading the image data from the image memory and transferring the image data to a predetermined external machine must be repeated more than once; long time is required.

Further, for example, in a conventional system having an image memory into which A3-size image data can be written, to transfer A4-size image data from the host computer, write the image data into the image memory, and output the written image data into a copier, when image data as large as the A4 size is read from the image memory, the remaining A4-size image memory area cannot be accessed. Thus, the memory use efficiency lowers. To perform such print operation consecutively, all the image data as large as the A4 size is read out before writing the image data transferred from the host computer is started. Thus, the print operation throughput lowers.

As means to avoid lowering the memory use efficiency or operation throughput, a memory may be divided into parts which can be operated independently. Such means is described in the Unexamined Japanese Patent Application Publication No. Hei 2-137040, the Examined Japanese Patent Application Publication No. Hei 6-93244, etc., for example.

In the system described in the Unexamined Japanese Patent Application Publication No. Hei 2-137040, an address generated from an address generator is supplied to an image memory, a specific one bit of the address is used as a chip enable signal of the image memory, and image memory divisions can be operated independently. However, the chip enable signal, which is a specific address bit, is exclusive, thus the image memory divisions cannot be accessed at the same time. The system described in the Examined Japanese Patent Application Publication No. Hei 6-93244 uses two memories in a pair and when the output enable signal for one memory is active, the output enable signal for the other memory becomes inactive. This means that when one memory performs write operation, the other memory performs read operation. However, in such a configuration, data written into the memory cannot be output to a number of external machines at the same time.

SUMMARY OF THE INVENTION

It is therefore an object of the invention to provide an image processing apparatus which avoids throughput degradation of the system operation and enables split use of image memory and simultaneous input/output from/to a plurality of external machines.

According to the invention as aspect 1, there is provided an image processing apparatus being connected to external machines for inputting data from the external machines to a plurality of image memories and outputting data from the image memories to the external machines, the image processing apparatus comprising a plurality of memory access controllers connected to the image memories and control means for selecting a first mode for the memory access controllers to access the image memories separately or a second mode for a master controller, one of the memory access controllers, to access the image memories as one image memory space and controlling the memory access controllers.

In the invention as aspect 2, in the image processing apparatus as in aspect 1, in the second mode, the master controller outputs a control signal to a slave controller, which is a memory access controller other than the master controller, for prohibiting the slave controller from accessing the image memory.

In the invention as in aspect 3, in the image processing apparatus as in aspect 2, the master controller and the slave controller adopt the same architecture.

In the invention as in aspect 4, the image processing apparatus as in aspect 1, further includes data selectors provided in a one-to-one correspondence with the external machines for controlling data input/output and an area signal generator for outputting an area signal indicating that data on a data bus is valid based on a control signal input from the external machine, wherein the memory access controllers operate based on the area signal output from the area signal generator.

In the invention as in aspect 5, the image processing apparatus as in aspect 4, further includes data bus controllers for controlling data input/output from/to the data selector and the image memory access controllers.

In the invention as in aspect 6, in the image processing apparatus as in aspect 5, as many data bus controllers as the number of connected external machines or the number of the image memories, whichever is the greater, are provided.

In the invention as in aspect 7, in the image processing apparatus as in aspect 5, the data bus controller can output data input from the one external machine to the several memory access controllers.

In the invention as in aspect 8, in the image processing apparatus as in aspect 5, the data bus controller can transfer data from the memory access controller to the one or more different memory access controllers.

In the invention as in aspect 9, in the image processing apparatus as in aspect 5, the control means controls sections based on instructions from the host computer and the data bus controller also controls data input/output from/to the host computer.

In the invention as in aspect 10, in the image processing apparatus as in aspect 5, the data bus controller inputs/outputs a predetermined invalid data value in a period in which data on the data bus is invalid.

In the invention as in aspect 11, in the image processing apparatus as in aspect 4, the memory access controller executes address conversion based on the area signal output from the area signal generator and given access position information and reads or writes data from or into the image memory.

In the invention as in aspect 12, in the image processing apparatus as in aspect 11, the memory access controller executes image conversion processing by the address conversion.

In the invention as in aspect 13, in the image processing apparatus as in aspect 4, the data selector can select any data read from the image memories and wherein the several data selectors can select data read from the one image memory for output to the external machines.

In the invention as in aspect 14, in the image processing apparatus as in aspect 4, the memory access controller has a mode for accessing the image memory in synchronization with a new synchronizing signal, even if the area signal output from the area signal generator is not valid.

In the invention as in aspect 15, in the image processing apparatus as in aspect 4, the memory access controller has a high-speed page access mode as well as a normal access mode.

In the invention as in aspect 16, in the image processing apparatus as in aspect 4, the memory access controller contains an FIFO and can set write timing of data into the FIFO.

BRIEF DESCRIPTION OF THE DRAWING

In the accompanying drawings:

FIG. 19 is an illustration to show the correspondence between the setup values and destination initial addresses in examples of mirror image processing and rotation.

DETAILED DESCRIPTION OF THE PREFERRED EMBODIMENTS

Figure 1:
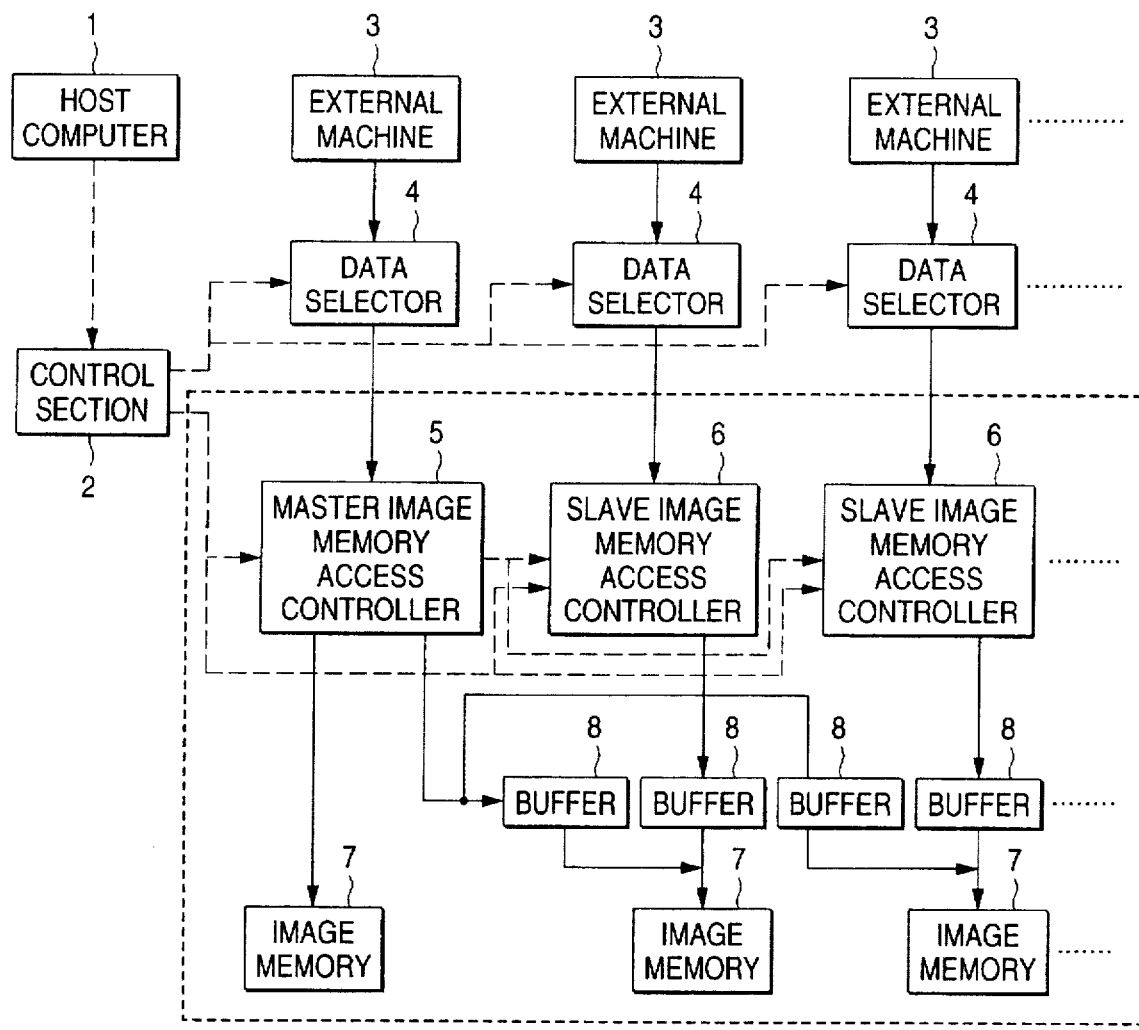
FIG. 1 is a block diagram to show a first embodiment of an image processing apparatus of the invention.

FIG. 1 is a block diagram to show a first embodiment of an image processing apparatus of the invention. In the figure, numeral 1 is a host computer, numeral 2 is a control section, numeral 3 is an external machine, numeral 4 is a data selector, numeral 5 is a master image memory access controller, numeral 6 is a slave image memory access controller, numeral 7 is an image memory, and numeral 8 is a buffer. The broken line in FIG. 1 denotes a control signal. The image memory access controller is abbreviated as IMAC. This acronym is also used in the description that follows.

The external machines 3 are copiers, printers, scanners, computers, etc., for example, and are connected to the data selectors 4 provided in a one-to-one correspondence with the external machines 3. The data selectors 4 are connected to the master image memory access controller 5 and the slave image memory access controllers 6, any of which is selected for connection to the external machine 3.

The master image memory access controller 5 and the slave image memory access controllers 6 are provided in a one-to-one correspondence with the image memories 7 and access the corresponding image memories 7. The master image memory access controller 5 has a mode accessing other image memories 7 as well as the corresponding image memory 7. In this mode, the master image memory access controller 5 sends a control signal for prohibiting access to the slave image memory access controllers 6 and can use a plurality of image memories 7 as one memory. Each slave image memory access controller 6 accesses the corresponding image memory 7 only when the access prohibiting control signal is not input from the master image memory access controller 5. The image memories 7 corresponding to the slave image memory access controllers 6 have each the buffer 8 between the corresponding slave image memory access, controller 6 and the master image memory access controller 5 for avoiding a data collision.

The master image memory access controller 5 and the slave image memory access controllers 6 can execute various types of address conversion in response to instructions from the control section 2, whereby various types of conversion processing such as image position move and rotation, mirror image processing, copy, and filling can be executed at the write or read time.

The control section 2 controls other members in response to instructions from the host computer 1. It causes the data selector 4 to select any of the master image memory access controller 5 and the slave image memory access controllers 6 for inputting/outputting data. The control section 2 controls the master image memory access controller 5 and the slave image memory access controllers 6 as to whether the image memories 7 are used separately or used as one memory by the master image memory access controller 5. It also selects an access mode from among the normal access mode, access mode in high-speed page mode, and refresh mode. Further, the control section 2 sends an area signal indicating whether data on a data bus connecting the data selector 4, the master image memory access controller 5, and the slave image memory access controllers 6 is valid or invalid to the master image memory access controller 5 and the slave image memory access controllers 6. In addition, the control section 2 also transfers various pieces of data such as information concerning an access position in the image memory 7 and image conversion processing.

The operation in the first embodiment will be outlined. First, the mode for using the image memories 7 separately will be discussed. In this mode, the external machines 3 can perform independent input/output operation and the master image memory access controller 5 and the slave image memory access controllers 6 operate independently of each other. To write image data from one external machine 3, the data selector 4 corresponding to the external machine 3 selects any data bus and sends the image data sent from the external machine 3 onto the selected data bus. At this time, the control section 2 outputs an area signal in synchronization with the image data sent onto the data bus. This area signal indicates whether the image data sent onto the data bus is valid or invalid, and only a part of the image data sent onto the data bus can also be made valid. The area signal enables separating the image data sent from the external machine 3.

The image memory access controller corresponding to the image bus selected by the data selector 4 reads the image data on the data bus based on the area signal output from the control section 2 and writes the image data into the image memory 7. At this time, the image memory access controller generates a write address according to the write position specified by the control section 2 and accesses the image memory 7. If a conversion processing instruction is given, address conversion is executed and conversion processing is performed. For example, the image position can be moved by making the separation position indicated by the area signal and the write position different. Also, rotation and mirror image conversion are enabled by changing the write position.

To read image data stored in one image memory 7, the data selector 4 selects the data bus corresponding to the image memory 7 storing the image data to be output. The image memory access controller reads the image data from the image memory and sends the image data to the data bus. Also at this time, the image memory access controller can perform image data conversion processing by converting the read address. It can also separate only a part of the read image data based on the area signal from the control section 2. The image data sent onto the data bus is sent via the data selector 4 to the external machine 3. More than one data selector 4 can also select the same data bus, in which case the same image data can be output to more than one external machine 3 at the same time.

In the mode for using a number of image memories 7 as one image memory, only the master image memory access controller 5 controls access to the image memories 7 and the Be slave image memory access controllers 6 are prohibited from accessing the image memories 7. This mode allows access only with one external machine.

When image data is written in the mode, the data selector 4 selects the data bus to the master image memory access controller 5. The image data from the external machine 3 is sent to the master image memory access controller 5, which then writes the image data into a specific image memory 7 in accordance with the write address. The area signal from the control section 2 is also valid. When image data is read, likewise the master image memory access controller 5 reads the image data from any image memory 7 and sends the image data to the data bus. The image data is output to the external machine 3 via the data selector 4 selecting the data bus.

In the example shown in FIG. 1, three external machines 3 and three image memories 7 are shown, but the invention is not limited to the numbers thereof. Any number of external machines 3 may be installed and data selectors 4 may be provided in a one-to-one correspondence with the installed external machines 3. The number of image memories 7 installed is also arbitrary and image memory access controllers may be provided in a one-to-one correspondence with the installed image memories 7. Further, more than one image memory can be placed corresponding to each of the master image memory access controller 5 and the slave image memory access controllers 6. For example, four image memories can be placed corresponding to each image memory access controller for handling cyan, magenta, yellow, and black images to provide an apparatus that can process full-color images.

Figure 2:
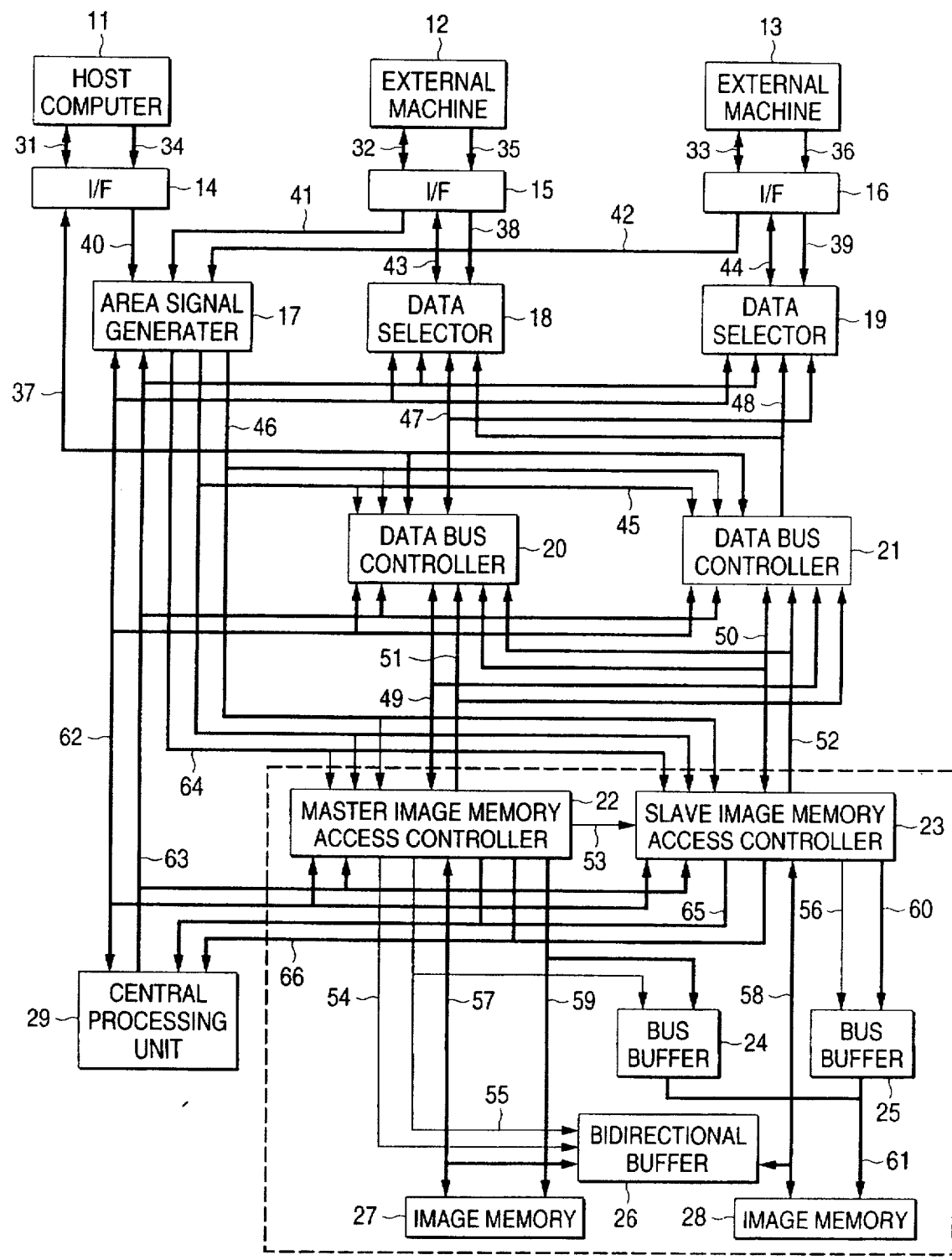
FIG. 2 is a block diagram to show a second embodiment of an image processing apparatus of the invention.

FIG. 2 is a block diagram to show a second embodiment of an image processing apparatus of the invention. In the figure, numeral 11 is a host computer, numerals 12 and 13 are external machines, numerals 14–16 are I/F (interface) blocks, numeral 17 is an area signal generator, numerals 18 and 19 are data selectors, numerals 20 and 21 are data bus controllers, numeral 22 is a master image memory access controller, numeral 23 is a slave image memory access controller, numerals 24 and 25 are bus buffers, numeral 26 is a bidirectional buffer, numerals 27 and 28 are image memories, numeral 29 is a central processing unit, numerals 31–33 are image data, numerals 34–36 are synchronizing signals, numeral 37 is a data bus, numerals 38 and 39 are image data buses, numerals 40–42 are synchronizing signals, numerals 43 and 44 are return synchronizing signals, numeral 45 is an area signal, numeral 46 is a video clock signal, numerals 47 and 48 are image data buses, numerals 49 and 50 are data buses, numerals 51 and 52 are synchronizing signals, numeral 53 is a control signal, numeral 54 is a buffer direction signal, numerals 55 and 56 are enable signals, numerals 57 and 58 are memory data buses, numerals 59–61 are memory control signals, numeral 62 is a data bus, numeral 63 is a control signal, numeral 64 is an enable signal, numeral 65 is a response signal, and numeral 66 is a processing termination signal.

The host computer 11 inputs/outputs image data from/to the external machines 12 and 13. It is connected to the central processing unit 29 by another interface (not shown) and gives various instructions to the central processing unit 29. The external machines 12 and 13 are external machines of a copier, a printer, a scanner, a computer, etc. For the host computer 11 and the external machines 12 and 13, the image data 31–33 and the synchronizing signals 34–36 containing a horizontal synchronizing signal, a vertical synchronizing signal, a clock signal, etc., are connected to the I/F blocks 14–16. The I/F blocks 14–16 synchronize the input synchronizing signals with the image data and perform image processing such as color correction.

The image data buses 38 and 39 from the I/F blocks 15 and 16 are connected to the data selectors 18 and 19 and the image data buses 47 and 48 from the data bus controllers 20 and 21 are connected to the data selectors 18 and 19. Predetermined values are preset in an internal storage unit by the data bus 62 and the control signals 63 containing a system clock signal, a chip select signal, an address, a write signal, and a read signal from the central processing unit 29, and the input/output directions of the data buses are controlled according to the setup values. At the reset time, all data buses enter an input mode to prevent a data collision on the data buses. When image data is output to the external machine 12, 13, the return synchronizing signal 43, 44 containing a and a return clock signal, a return horizontal synchronizing signal, and a return vertical synchronizing signal is output to the I/F block 15, 16 so as to easily synchronize the output image data.

The area signal generator 17 inputs the synchronizing signals 40–42 containing a horizontal synchronizing signal, a vertical synchronizing signal, a clock signal, etc., from the I/F blocks 14–16, selects one from among the input synchronizing signals according to a predetermined preset value stored in the internal storage unit by the data bus 62 and the control signal 63 from the central processing unit 29, and uses the selected synchronizing signal to output the area signal 45 which becomes active when image data is valid, the enable signal 64 for enabling the image memory access controller operation, and the video clock signal 46. The area signal is output based on the area signal generation position and active width previously stored in the internal storage unit by the data bus 62 and the control signal 63 from the central processing unit 29. Further, the enable signal 64 for the image memory access controller 22, 23 is output at a predetermined timing according to the setup value previously stored by the data bus 62 and the control signal 63 from the central processing unit 29.

The data buses 47 and 48 from the data selectors 18 and 19, the data buses 49 and 50 from the image memory access controllers 22 and 23, and the data bus 37 from the I/F block 14 are connected to the data bus controllers 20 and 21 for controlling the input/output directions of the data buses according to the setup values previously stored in the internal storage unit by the data bus 62 and the control signal 63 from the central processing unit 29. At the reset time, all data buses enter an input mode to prevent a data collision on the data buses. When image data is output, one is selected from among the area signal 45 and the video clock signal 46 from the area signal generator 17 and the synchronizing signals 51 and 52 containing horizontal and vertical synchronizing signals from the image memory access controllers 22 and 23 according to the setup value previously stored in the storage unit by the data bus 62 and the control signal 63 from the central processing unit 29, and image data synchronized with the selected synchronizing signal is output.

The image memory access controller 22, 23 generates a new synchronizing signal and accesses the image memory 27, 28 in synchronization with the generated synchronizing signal. The image memory access controller 22, 23 has two types of operation modes of an area synchronous mode synchronized with the area signal 45 output from the area signal generator 17 and an asynchronous mode not synchronized with the area signal 45, and can operate in either mode. In both modes, when the new generated synchronizing signal is inactive, the image memory access controller 22, 23 places the memory control signal 59, 60 containing an NRAS signal, an NCASL signal, an NCASH signal, an NWE signal, an address in a refresh cycle for refreshing the image memory 27, 28 so that the data written thereinto can also be held when the image memory 27, 28 is not accessed. In the area synchronous mode, the image memory access controller 22, 23 has two types of access methods of normal access and high-speed page access to the image memory 27, 28. The mode can be changed or the access method can be selected by changing the setup value in the storage unit by the data bus 62 and the control signal 63 from the central processing unit 29. In both modes, a new generated synchronization signal is output in accordance with access position information preset in the storage unit by the data bus 62 and the control signal 63 from the central processing unit 29.

A predetermined value is set in the internal storage units of the master image memory access controller 22 and the slave image memory access controller 23 by the data bus 62 and the control signal 63 from the central processing unit 29, whereby a 2-chip mode for using the image memories 27 and 28 separately and a 1-chip mode for the master image memory access controller 22 to occupy the image memories 27 and 28 can be changed for accessing the image memories 27 an 28.

In the 2-chip mode, the master image memory access controller 22 deactivates the enable signal 55 of the bidirectional buffer 26 and the bus buffer 24 and activates the control signal 53 for the slave image memory access controller 23 at the same time according to the setup value. The slave image memory access controller 23 activates the enable signal 56 of the bus buffer 25 according to the value set by the data bus 62 and the control signal 63 from the central processing unit 29 and the value of the control signal 36. Then, the data bus 57 and the control signal 59 from the master image memory access controller 22 make it possible to access the image memory 27; the data bus 58 and the control signal 60 from the slave image memory access controller 23 make it possible to access the image memory 28.

Likewise, the 1-chip mode is also provided by setting a predetermined value in the internal storage units of the master image memory access controller 22 and the slave image memory access controller 23 by the data bus 62 and the control signal 63 from the central processing unit 29. At this time, the master image memory access controller 22 activates the enable signal 55 of the bidirectional buffer 26 and the bus buffer 24 and deactivates the control signal 53 for the slave image memory access controller 23 at the same time. The slave image memory access controller 23 deactivates the enable signal 56 of the bus buffer 25 according to the value set by the data bus 62 and the control signal 63 from the central processing unit 29 and the value of the control signal 53, whereby the control signal 60 from the slave image memory access controller 23 is not output to the image memory 28 and instead the control signal 59 from the master image memory access controller 22 is output to the image memory 28, enabling the master image memory access controller 22 to access the image memory 28 as well as the image memory 27.

Figure 3:
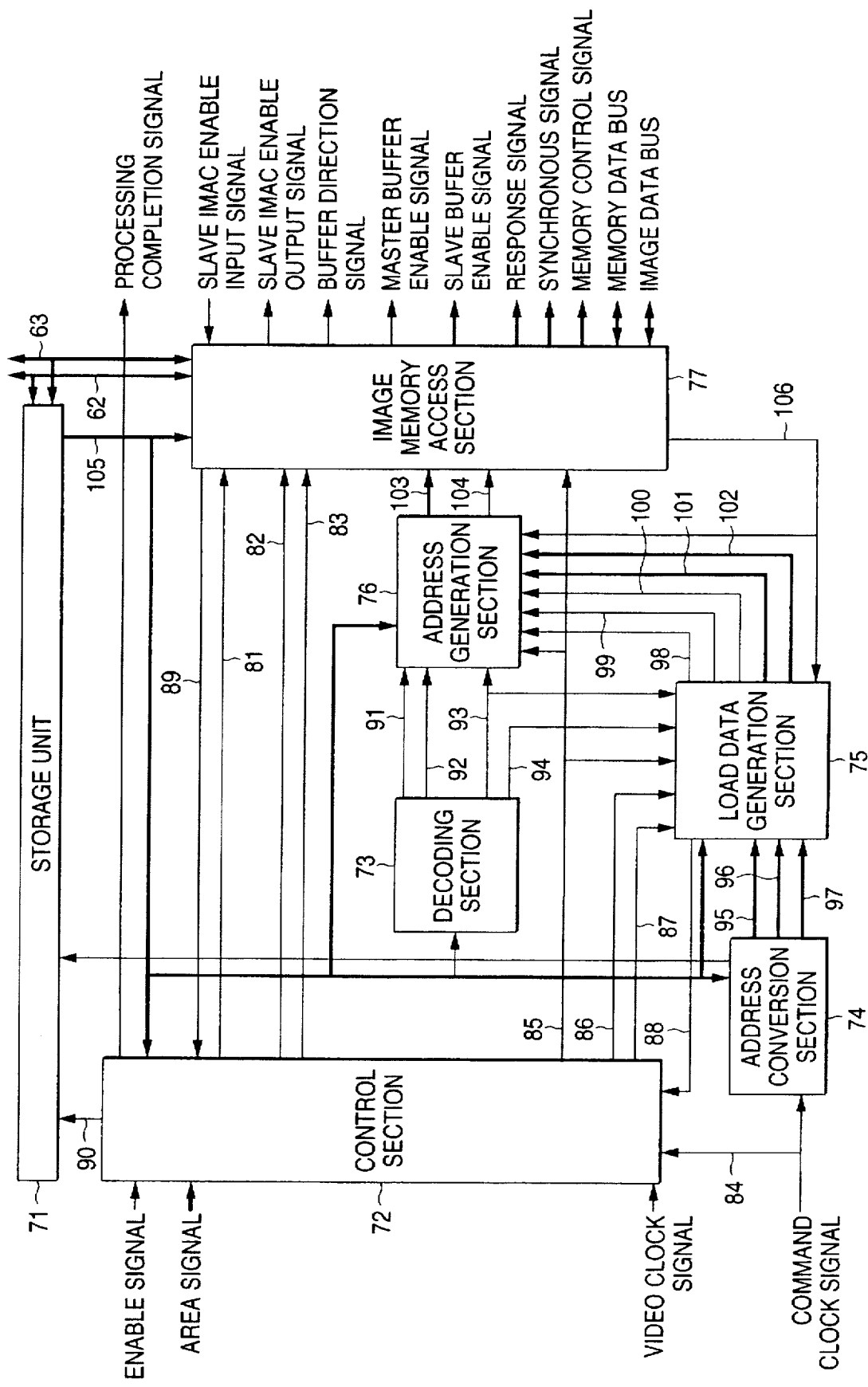
FIG. 3 is a block diagram to show an example of an image memory access controller.

FIG. 3 is a block diagram to show an example of the image memory access controller. In the figure, numeral 71 is a storage unit, numeral 72 is a control section, numeral 73 is a decoding section, numeral 74 is an address conversion section, numeral 75 is a load data generation section, numeral 76 is an address generation section, numeral 77 is an image memory access section, numeral 81 is a vertical direction reference synchronizing signal, numeral 82 is a horizontal direction reference synchronizing signal, numeral 83 is a refresh stop signal, numeral 84 is a command clock signal, numeral 85 is a reference clock signal, numeral 86 is a vertical direction falling edge detection signal, numeral 87 is a load clock signal, numeral 88 is a copy termination signal, numeral 89 is an error signal, numeral 90 is an error sensing signal, numeral 91 is a horizontal direction addition signal, numeral 92 is a count-up signal, numeral 93 is an addition address selection signal, numeral 94 is a vertical direction addition signal, numeral 95 is a destination initial address, numeral 96 is a source initial address, numeral 97 is an image area distance, numeral 98 is an S address enable signal, numeral 99 is a D counter enable signal, numeral 100 is an S counter enable signal, numeral 101 is an S load address, numeral 102 is a D load address, numeral 103 is an internal address, numeral 104 is a page mode stop signal, numeral 105 is a setup value, numeral 106 is an access synchronizing signal, and numeral 107 is an address conversion termination signal.

Values are set in the storage unit 71 by the data bus 62 and the control signal 63 from the central processing unit 29. Necessary ones of the setup values 105 are given to the sections.

The control section 72 selects either the video clock signal 46 or the command clock signal 84 and outputs the selected signal as the reference clock signal 85. It receives the enable signal 64, the area signal 45, and the video clock signal 46 from the area signal generation section 17, generates the vertical direction reference synchronizing signal 81 and the horizontal direction reference synchronizing signal 82 based on the reference clock signal 85 in or out of synchronization with the area signal 45, and outputs the signals to the image memory access section 77. It also outputs the refresh stop signal 83 so as to suppress refresh during data transfer. Further, the control section 72 generates the vertical direction falling edge detection signal 86 and the load clock signal 87 based on the generated vertical direction reference synchronizing signal 81 and outputs the signals to the load data generation section 75. The error signal 89 output from the image memory access section 77 is output to the storage unit 71 as the error sensing signal 90. The copy termination signal 88 output from the load data generation section is output as the processing termination signal 66.

The decoding section 73 decodes the value of the setup value 105 set in the storage unit 71, generates the horizontal direction addition signal 91, the count-up signal 92, the addition address selection signal 93, and the vertical direction addition signal 94, and outputs the horizontal direction addition signal 91, the count-up signal 92, and the addition address selection signal 93 to the address generation section 76 and the addition address selection signal 93 and the vertical direction addition signal 94 to the load data generation section 75.

The address conversion section 74 calculates the initial addresses of a source image area and a destination image area as the destination initial address 95 and the source initial address 96 and the distance between both the areas as the image area distance 97 and outputs them to the load data generation section 75. It also outputs the address conversion termination signal 107 to the storage unit 71. The source image area and the destination image area refer to a source image area and a destination image area when a copy of one function of the image processing apparatus is made.

The load data generation section 75 updates an address in the vertical direction based on the load clock signal 87. For the source image area, the source initial address 96 is used as the initial value and the S load address 101 is updated in sequence. To indicate whether the S load address 101 is valid or invalid, the S address enable signal 98 is also output. For the destination image area, the destination initial address 95 is used as the initial value and the address responsive to the number of copy times, addition data selected by the addition address selection signal 93, and the like are added for updating the D load address 102. The S counter enable signal 100 or the D counter enable signal 99 is selectively output in response to accessing data in the horizontal direction of which of the source and destination image areas. The addresses and signals are input to the address generation section 76. The load data generation section 75 operates in synchronization with the access synchronizing signal 106 output from the image memory access section. Further, at the termination of the copy operation as many times as the number of copy times specified in the setup value 105, the load data generation section 75 outputs the copy termination signal 88 to the control section 72.

The address generation section 76 updates an address in the horizontal direction based on the reference clock signal 85. When the D counter enable signal 99 is output, the address generation section 76 performs the count operation based on the D load address 102 and outputs the address of the destination image area as the internal address 103. At this time, up count and down count can be switched by the count up signal 92. When the S counter enable signal 100 is output, the address generation section 76 performs the count operation based on the S load address 101 and outputs the address of the source image area as the internal address 103. This switch is performed by the S address enable signal 98. The rotation address of the source image area is also generated and is switched to the normal address by the addition address selection signal 93. For accessing in the high-speed page mode, when a given amount of data is accessed, the access is once stopped. Thus, the page mode stop signal 104 is also generated and is output to the image memory access section 77.

The image memory access section 77 accesses the image memory 27 or 28 based on the vertical direction reference synchronizing signal 81, the horizontal direction reference synchronizing signal 82, the refresh stop signal 83, and the reference clock signal 85 output from the control section 72, the internal address 103 and the page mode stop signal 104 output from the address generation section 76, the setup value 105 stored in the storage unit 71, and the like. The image memory access section 77 is connected to the image memory 27 or 28 by the memory data bus and outputs a memory control signal. It is connected to the data bus controller 20, 21 by the image data bus and outputs a synchronizing signal. The image memory access section 77 outputs a response signal to the central processing unit 29 and is connected to the data bus 62 for inputting the control signal 63.

Since the configuration is common to the master image memory access controller 22 and the slave image memory access controller 23, the image memory access section 77 has the functions of both the controllers. A slave IMAC enable output signal for stopping the function of the slave image memory access controller 23, a buffer direction signal for controlling the operation of the bidirectional buffer 26, and a master buffer enable signal for controlling the operation of the bus buffer 24 are output as the function of the master image memory access controller 22. A slave IMAC enable input signal for receiving the slave IMAC enable output signal from the master image memory access controller 22 is input and a slave buffer enable signal for controlling the operation of the bus buffer 25 is output as the function of the slave image memory access controller 23.

Figure 4:
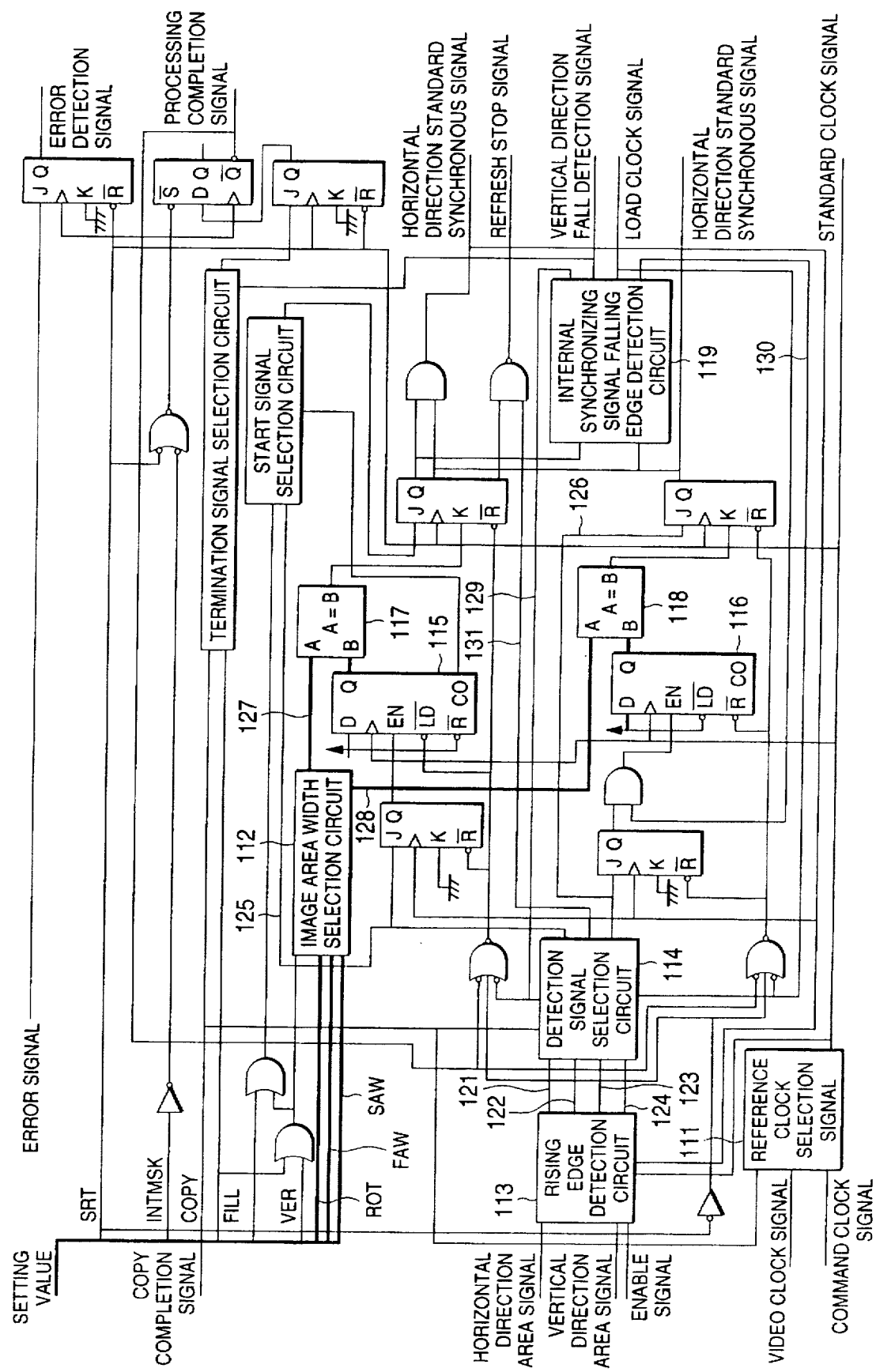
FIG. 4 is a block diagram to show an example of a control section.

FIG. 4 is a block diagram to show an example of the control section. In the figure, numeral 111 is a reference clock selection signal, numeral 112 is an image area width selection circuit, numeral 113 is a rising edge detection circuit, numeral 114 is a detection signal selection circuit, numeral 115 is a pixel counter, numeral 116 is a line counter, numerals 117 and 118 are comparators, numeral 119 is an internal synchronizing signal falling edge detection circuit, numeral 121 is an SRT rising edge detection signal, numeral 122 is a horizontal direction rising edge detection signal, numeral 123 is a vertical direction rising edge detection signal, numeral 124 is a reference rising edge detection signal, numeral 125 is a horizontal direction start signal, numeral 126 is a vertical direction start signal, numeral 127 is a horizontal direction image width, numeral 128 is a vertical direction image width, numeral 129 is a horizontal direction falling edge detection delay signal, numeral 130 is a vertical direction falling edge detection delay signal, and numeral 131 is a refresh mask signal. SRT is a setup value indicating operation enable. INTMSK is a setup value enabling output of the processing termination signal 66, COPY, FILL, and VER are setup values enabling copying, filling, and verifying respectively, ROT is a setup value of a rotation angle at the rotation processing time, and FAW and SAW are setup values of image area widths in the horizontal direction and vertical direction in the image memory. Here, only the main sections will be discussed.

The reference clock selection circuit 111 selects either the video clock signal 46 or the command clock signal and outputs the selected signal to the sections as the reference clock signal 85. The image area width selection circuit 112 outputs the horizontal direction image width 127 and the vertical direction image width 128 from FAW and SAW, the setup values of image area widths in the horizontal direction and vertical direction in the image memory, and ROT, the setup value of a rotation angle at the rotation processing time.

The rising edge detection circuit 113 inputs the setup value SRT, the area signal 45 containing a horizontal direction area signal and a vertical direction area signal, the enable signal 64, the horizontal direction reference synchronizing signal 82 generated by the control section, and the reference clock signal 85 output from the reference clock selection circuit 111, detects the signal rising edge, and outputs the SRT rising edge detection signal 121, the horizontal direction rising edge detection signal 122, the vertical direction rising edge detection signal 123, and the reference rising edge detection signal 124. The detection signal selection circuit 114 receives the signals and the vertical direction falling edge detection delay signal 130 output from the internal synchronizing signal falling edge detection circuit, and outputs the horizontal direction start signal 125, the vertical direction start signal 126, and the refresh mask signal 131.

The pixel counter 115 counts the reference clock signal 85 while the horizontal direction start signal 125 is active, and the comparator 117 compares the count with the horizontal direction image width 127. The horizontal direction reference synchronizing signal 82 with a horizontal start point signal to a match signal of the comparator 117 as an active period is generated.

Likewise, the line counter 116 counts lines while the vertical direction start signal 126 is active, and the comparator 118 compares the count with the vertical direction image width 128. The vertical direction reference synchronizing signal 81 with the rising edge of the vertical direction start signal 126 to a match signal of the comparator. 118 as an active period is generated.

The internal synchronizing signal falling edge detection circuit 119 receives the generated vertical direction reference synchronizing signal 81, horizontal direction reference synchronizing signal 82, etc., detects the signal falling edge, and generates and outputs the vertical direction falling edge detection signal 86, the vertical direction falling edge detection delay signal 130, the load clock signal 87, the horizontal direction falling edge detection delay signal, etc.

Figure 5:
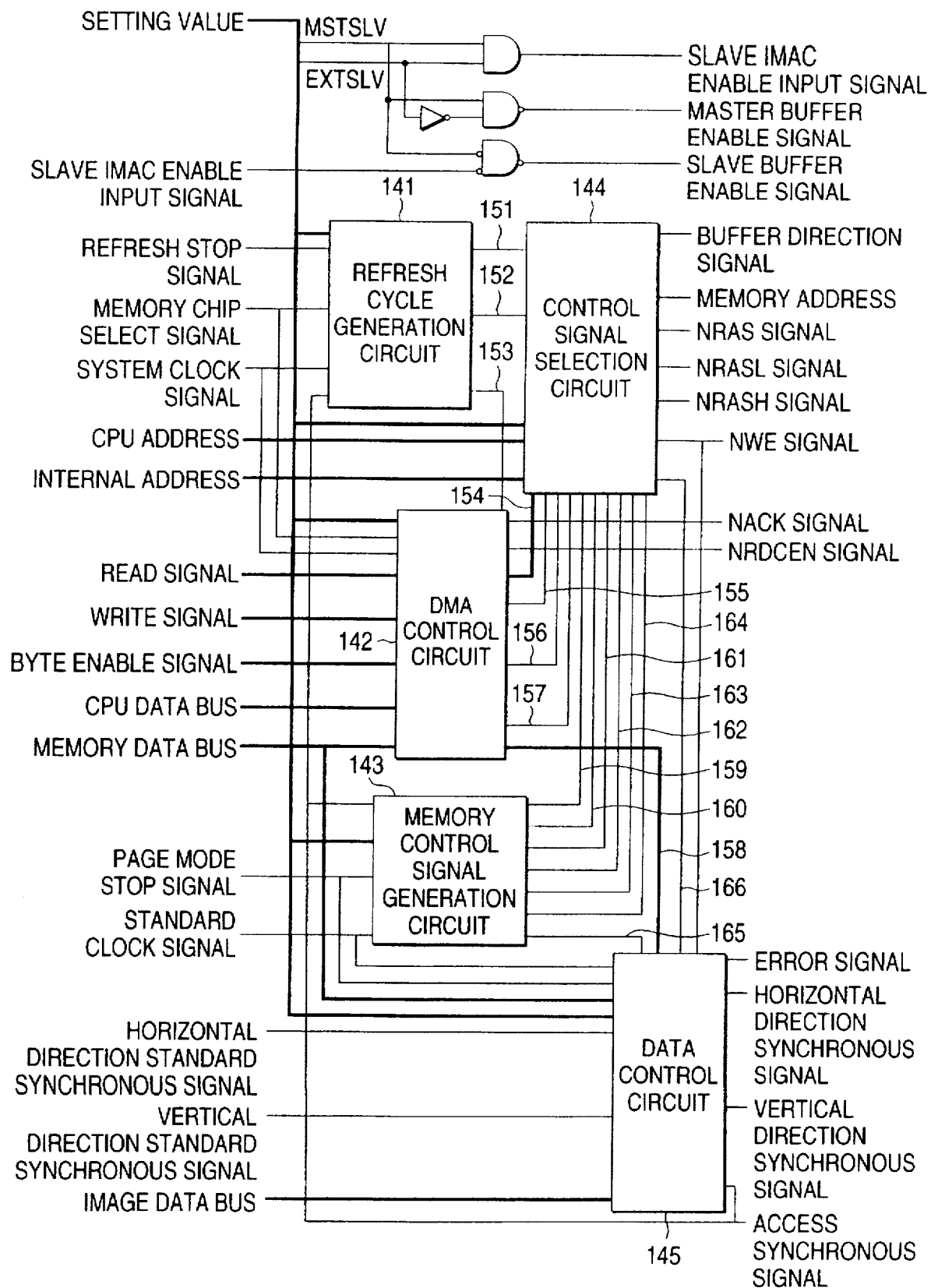
FIG. 5 is a block diagram to show an example of an image memory access section.

FIG. 5 is a block diagram to show an example of the image memory access section. In the figure, numeral 141 is a refresh cycle generation circuit, numeral 142 is a DMA control circuit, numeral 143 is a memory control signal generation circuit, numeral 144 is a control signal selection circuit, numeral 145 is a data control circuit, numeral 151 is a refresh RAS signal, numeral 152 is a refresh CAS signal, numeral 153 is a refresh cycle signal, numeral 154 is a low-order address, numeral 155 is a direct RAS signal, numeral 156 is a direct CAS signal, numeral 157 is a direct WE signal, numeral 158 is a direct write data, numeral 159 is a page mode RAS signal, numeral 160 is a page mode CAS signal, numeral 161 is a page mode WE signal, numeral 162 is a regular mode RAS signal, numeral 163 is a regular mode CAS signal, numeral 164 is a regular mode WE signal, numeral 165 is a read/write change signal, and numeral 166 is a CAS clock signal. MSTSLV is a setup value for selecting the master or slave image memory access controller and EXTSLV is a setup value for enabling the slave image memory access controller to access the image memory.

The image memory access section 77 in FIG. 3 uses the control signal selection circuit to select the refresh cycle generation circuit 141 for controlling memory refresh, the DMA control circuit 142 for controlling DMA transfer, the memory control signal generation circuit 143 for controlling normal image memory access and access in the high-speed page mode, a refresh signal, a DMA control signal, a normal access signal, or an access signal in the high-speed page mode, and outputs the selected signal to the image memory, as shown in FIG. 5. The data control circuit 145 controls read data or data to be written. The image memory 27, 28 is accessed by the RAS signals and the CAS signals, and read and write are changed by the WE (write enable) signal.

The refresh cycle generation circuit 141 counts system clock signals by an internal counter and generates a predetermined-cycle refresh cycle signal 153. It also generates the refresh RAS signal 151 and the refresh CAS signal 152 according to the refresh cycle signal 153, the refresh stop signal 83, the memory chip select signal, the access synchronizing signal, etc.

The DMA control circuit 142 generates and outputs the low-order address 154 at the DMA transfer time and outputs the direct RAS signal 155, the direct CAS signal 156, and the direct WE signal 157. It also executes data transfer to and from the central processing unit 29 and outputs data read from the image memory 27 or 28 directly to the data bus 62 of the central processing unit 29. Write data from the central processing unit 29 is once output to the data control circuit 145 as the direct write data 158 and is written into the image memory 27 or 28 from the data control circuit 145.

The memory control signal generation circuit 143 generates control signals for normal access and high-speed page mode access. In the normal access, the RAS signal and CAS signal are changed each time access is made. In this case, the RAS and CAS signal timings are shifted for changing the signals, thus one cycle is prolonged. In the high-speed page mode, each time access is made, only the CAS signal is changed with the RAS signal fixed, whereby consecutive access in the row direction can be executed at high speed. The memory control signal generation circuit 143 generates and outputs the RAS, CAS, and WE signals corresponding to the two access modes; it outputs the page mode RAS signal 159, the page mode CAS signal 160, and the page mode WE signal 161 for the high-speed page mode access and the regular mode RAS signal 162, the regular mode CAS signal 163, and the regular mode WE signal 164 for the normal access mode. The memory control signal generation circuit 143 also outputs the read/write change signal 165 to the data control circuit 145.

The control signal selection circuit 144 selects the high-speed page mode access control signals or the normal access mode control signals from the refresh cycle generation circuit 141, the DMA control circuit 142, and the memory control signal generation circuit 143 appropriately depending on which access mode is applied, and outputs the NRAS signal, NCASL signal, NCASH signal, and NWE signal to the image memory 27, 28. It also outputs the internal address 103 as a memory address and further outputs the CAS clock signal 166 to the data control circuit 145.

The data control circuit 145 executes data transfer between the memory data bus 571 58 and the image data bus 49, 50. At this time, it adjusts the transfer rate in response to the processing speed of the external machine 12, 13. The data control circuit 145 performs data control for processing, for example, so as to output fixed-value data, increment data, decrement data, etc., in write processing of predetermined fixed-value data, increment data, or decrement data into one area of the image memory 27 or 28, which will be hereinafter referred to as filling.

The image memory access section 77 also generates and outputs the slave IMAC enable output signal, the master buffer enable signal 55, and the slave buffer enable signal 56 in accordance with the setup values MSTSLV and EXTSLV and the slave IMAC enable input signal sent from the master image memory access controller 22.

Figure 6:
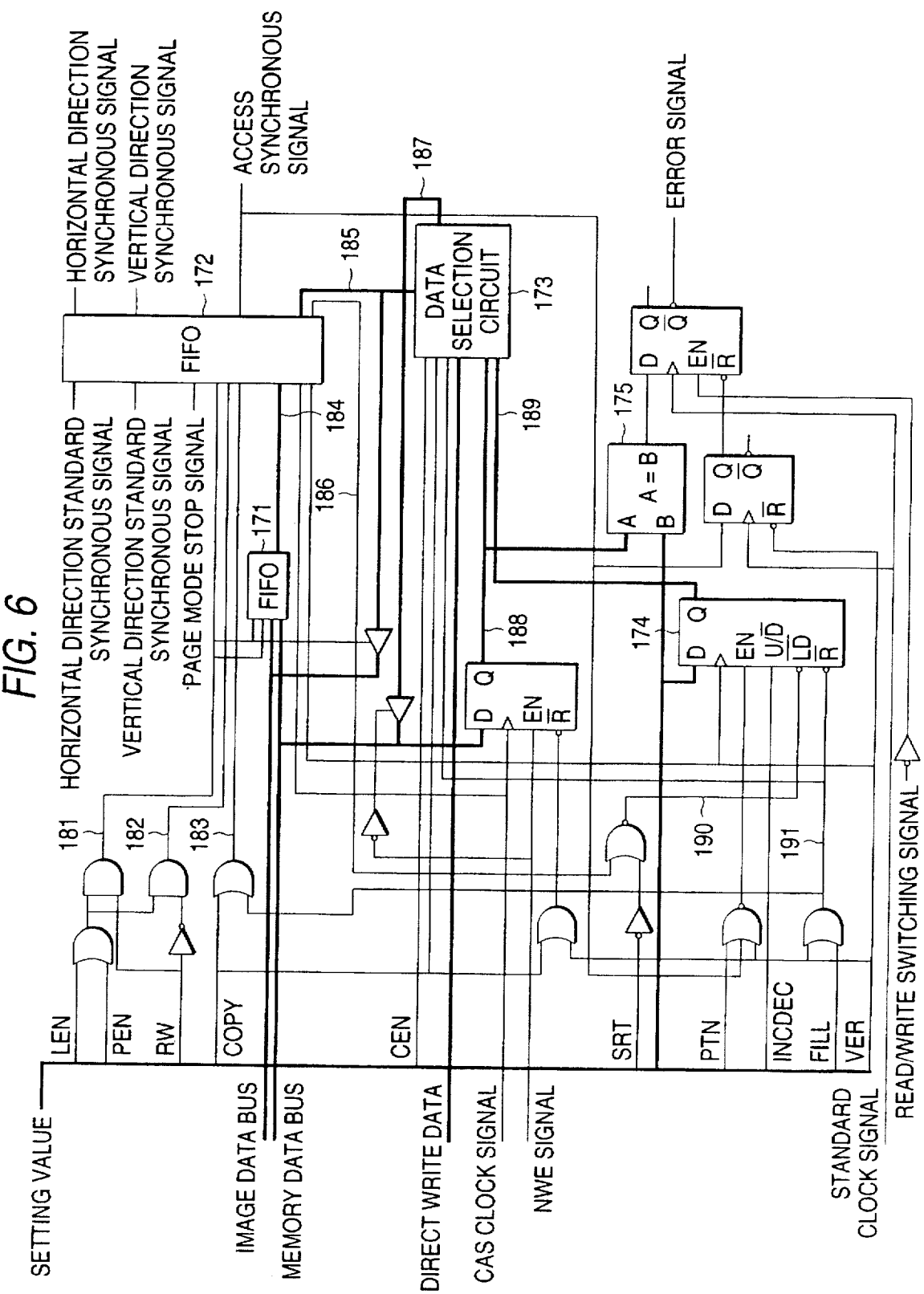
FIG. 6 is a block diagram to show an example of a data control circuit.

FIG. 6 is a block diagram to show an example of the data control circuit. In the figure, numeral 171 is an FIFO data selection circuit, numeral 172 is an FIFO control circuit, numeral 173 is a data selection circuit, numeral 174 is a fill counter, numeral 175 is a comparator, numeral 181 is a memory read enable signal, numeral 182 is a memory write enable signal, numeral 183 is a CVF enable signal, numeral 184 is FIFO input data, numeral 185 is FIFO output data, numeral 186 is a horizontal direction falling edge detection signal, numeral 187 is memory write data, numeral 188 is CV data, numeral 189 is FILL data, numeral 190 is a FILL data load signal, and numeral 191 is a VF enable signal. IEN is a setup value for accessing in the high-speed page mode, PEN is a setup value for accessing in the normal mode, RW is a setup value for setting directions of the memory data bus and the image data bus, COPY, FILL, and VER are setup values for enabling copying, filling, and verifying respectively, CEN is a setup value for enabling direct image memory access from the central processing unit, SRT is a setup value for enabling the operation, FP is a setup value for setting a fill pattern, and PTN and INCDEC are setup values for setting fill pattern types.

The data control circuit 145 in the image memory access section shown in FIG. 5 consists mainly of the FIFO data selection circuit 171 and the FIFO control circuit 172 for FIFO control, the data selection circuit 173 for data input/output control, and the fill counter 174, the comparator 175, etc., for filling, as shown in FIG. 6.

The FIFO data selection circuit 171 selects either the image data bus 49, 50 or the memory data bus 57, 58 as a source bus in accordance with the memory read enable signal 181 and the memory write enable signal 182 and passes data to the FIFO control circuit 172 as the FIFO input data 184. The FIFO control circuit 172 contains an FIFO memory so as to be able to temporarily hold the FIFO input data 184. The FIFO output data 185 output from the FIFO memory is sent to the image data bus 49, 50 at the read time or the data selection circuit 173 at the write time. For example, if the external machine 12 or 13 can process image data at high speed, high-speed page mode access is made under the control of the FIFO control circuit 172. However, when a given amount of data is accessed in the high-speed page mode, the access must be once stopped, thus the FIFO memory can be used to adjust the timing.

The data selection circuit 173 selects the FIFO output data 185, the direct write data 158, the CV data 188, or the FILL data 189 and outputs the selected data to the memory data bus 57, 58 as the memory write data 187. The CV data 188 is data when copying or verifying is performed. The FILL data 189 is the setup value FP or a value provided by incrementing or decrementing the setup value FP by the fill counter 174 in sequence.

Figure 7:
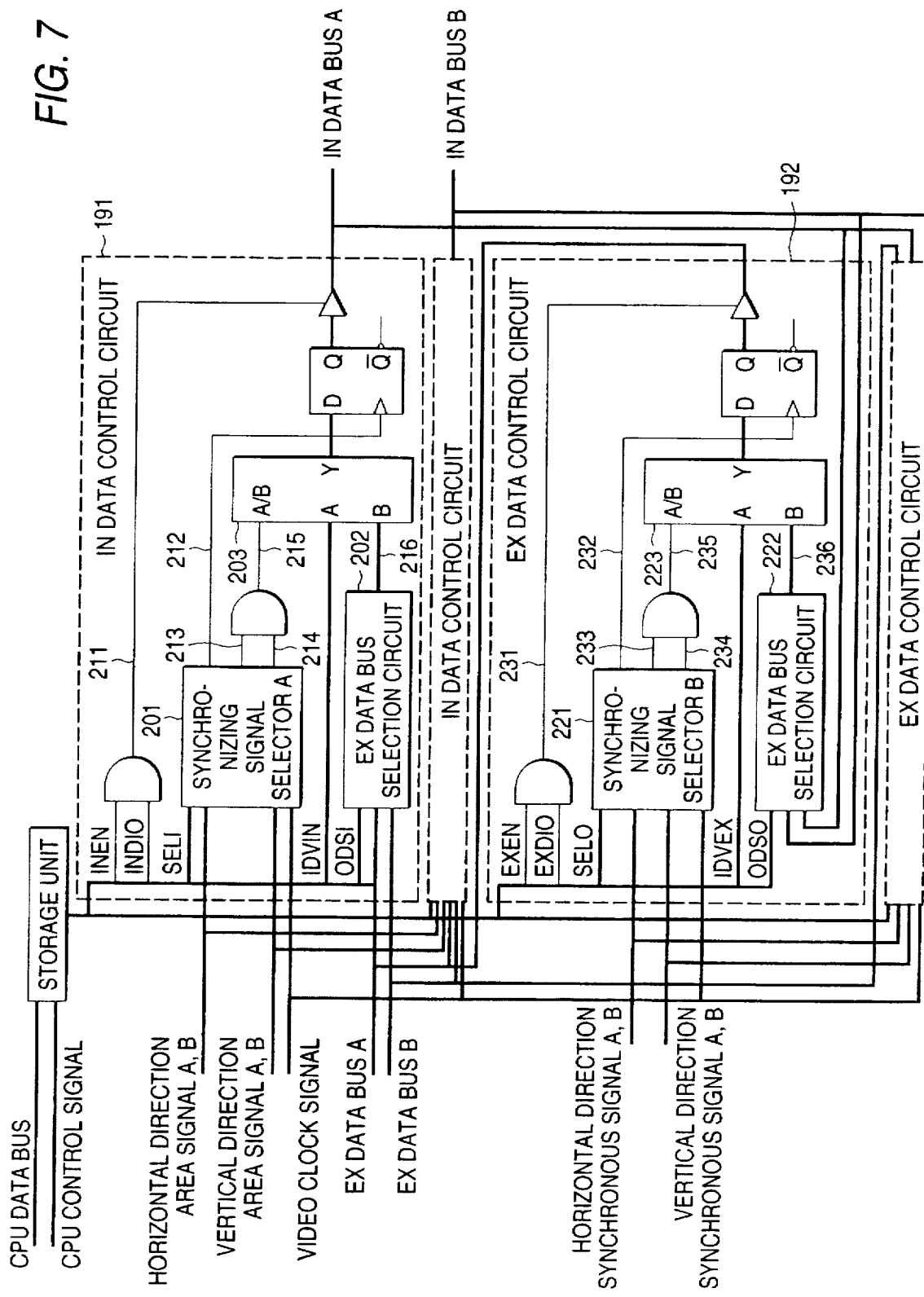
FIG. 7 is a block diagram to show an example of a data bus controller.

FIG. 7 is a block diagram to show an example of the data bus controller. In the figure, numeral 191 is an IN data control circuit, numeral 192 is an EX data control circuit, numeral 193 is a storage unit, numeral 201 is a synchronizing signal selector A, numeral 202 is an EX data bus selection circuit, numeral 203 is a selector, numeral 211 is an IN data read enable signal, numeral 212 is an EX selection clock signal, numeral 213 is an EX selection horizontal area signal, numeral 214 is an EX selection vertical area signal, numeral 215 is an internal area signal, numeral 216 is EX selection 25 data, numeral 221 is a synchronizing signal selector B, numeral 222 is an IN data bus selection circuit, numeral 223 is a selector, numeral 231 is EX data read enable signal, numeral 232 is an IN selection clock signal, numeral 233 is an IN selection horizontal synchronizing signal, numeral 234 is an IN selection vertical synchronizing signal, numeral 235 is an internal synchronizing signal, and numeral 236 is IN selection data. INEN and INDIO are setup values for enabling IN data bus input/output, SELI is a setup value for selecting a synchronizing signal used as the reference when data is output from the IN data bus, IDVIN is a setup value of a value of data to be output from the IN data bus when the area signal is inactive, ODSI is a setup value for selecting data output from the IN data bus, EXEN and EXDIO are setup values for enabling EX data bus input/output, SELO is a setup value for selecting a synchronizing signal used as the reference when data is output from the EX data bus, IDVEX is a setup value of a value of data to be output from the EX data bus when the area signal is inactive, and ODSO is a setup value for selecting data output from the EX data bus. The central processing unit 29 sets the values in the storage unit 193 via the data bus 62.

The data bus controller 20, 21 shown in FIG. 2 is made up of the IN data control circuit 191 and the EX data control circuit 192, as shown in FIG. 7. The EX data bus is the image data bus 47, 48 connected to the data selector 18, 19. The IN data bus is the data bus 49, 50 connected to the image memory access controller 22, 23. The IN data control circuit 191 is provided corresponding to the image memory 27, 28 for controlling write of data from the EX data bus into the image memory 27, 28. The EX data control circuit 192 is provided corresponding to the external machine 12, 13 for controlling output of data read from the image memory 27, 28 to the external machine 12, 13 or another image memory.

The IN data control circuit 191 selects control signals and data from the external machine selected by the synchronizing signal selector A 201 and the EX data bus selection circuit 202 and outputs the EX selection horizontal area signal 213, the EX selection vertical area signal 214, and the EX selection data 216. The EX selection horizontal area signal 213 and the EX selection vertical area signal 214 are used to select the EX selection data 216 or the setup value IDVIN in the selector 203 as the internal area signal 215, whereby in the area, the data sent from the EX data bus is output to the IN data bus; outside the area, the setup value IDVIN is output.

The EX data control circuit 192, which is similar to the IN data control circuit 191, selects control signals and data from the image memory access controller selected by the synchronizing signal selector B 221 and the IN data bus selection circuit 222 and outputs the IN selection clock signal 232, the IN selection horizontal synchronizing signal 233, the IN selection vertical synchronizing signal 234, and the IN selection data 236. The IN selection horizontal synchronizing signal 233 and the IN selection vertical synchronizing signal 234 are used to select the IN selection data 236 or the setup value IDVEX in the selector 223 as the internal area signal 235, whereby the data read from the image memory is output intact and the portion outside the range is filled with the setup value IDVEX for output to the external machine.

Figure 8:
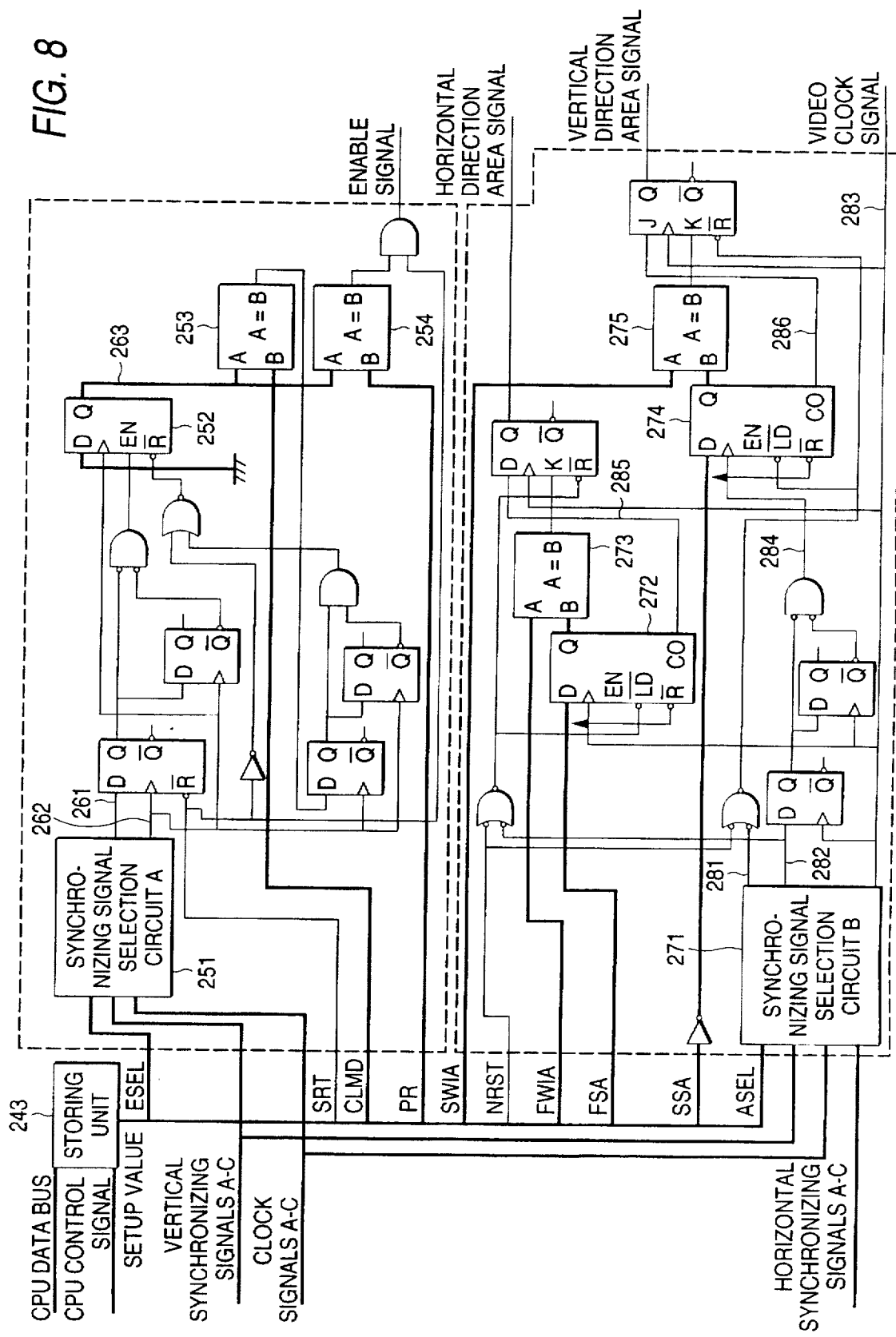
FIG. 8 is a block diagram to show an example of an area signal generator.

FIG. 8 is a block diagram to show an example of the area signal generator. In the figure, numeral 241 is an enable signal generation circuit, numeral 242 is an area signal generation circuit, numeral 243 is a storage unit, numeral 251 is a synchronizing signal selection circuit A, numeral 252 is a page counter, numerals 253 and 254 are comparators, numeral 261 is an internal vertical synchronizing signal, numeral 262 is an internal clock signal, numeral 263 is a page count, numeral 271 is a synchronizing signal selection circuit B, numeral 272 is a horizontal area counter, numerals 273 and 275 are comparators, numeral 274 is a vertical area counter, numeral 281 is an internal vertical synchronizing signal, numeral 282 is an internal horizontal synchronizing signal, numeral 283 is an internal clock signal, numeral 284 is a rising edge detection signal, numeral 285 is a horizontal area start signal, and numeral 286 is a vertical area start signal. ESEL is a setup value for selecting a synchronizing signal, SRT is a setup value for enabling generation of an enable signal, CLMD is a setup value for setting a color mode, PR is a setup value for setting the generation timing of an enable signal, SWIA is a setup value for setting the active width of a vertical direction area signal, NRST is a setup value of reset, FWIA is a setup value for setting the active width of a horizontal direction area signal, FSA is a setup value for setting the start point of a horizontal direction area signal, SSA is a setup value for setting the start point of a vertical direction area signal, and ASEL is a setup value for selecting a synchronizing signal.

The area signal generator 17 shown in FIG. 2 is made up of enable signal generation circuits 241 for generating the enable signal 64, an area signal generation circuit 242 for generating the area signal 45 and the video clock signal 46, and a storage unit 243. The enable signal generation circuits 241 are provided in a one-to-one correspondence with the image memory access controllers. More than one area signal generation circuit 242 is also provided as required.

The synchronizing signal selection circuit A 251 of the enable signal generation circuit 241 selects a vertical synchronizing signal and a clock signal according to the setup value ESEL from the synchronizing signals 40–42 output from the host computer 11 and the external machines 12 and 13, and outputs the internal vertical synchronizing signal 261 and the internal clock signal 262. The page counter 252 counts pages from the internal vertical synchronizing signal 261 and outputs the page count 263. The comparator 253 resets the page counter 252 when a predetermined number of pages is reached according to the setup value CLMD. For example, in the color mode, three or four pages make up one screen, thus the number of pages is counted. The comparator 254 generates the enable signal 64 only when pages are stored in the corresponding image memory in the predetermined number of pages.

In the area signal generation circuit 242, the synchronizing signal selection circuit B 271 selects a vertical synchronizing signal, a horizontal synchronizing signal, and a clock signal according to the setup value ASEL from the synchronizing signals 40–42 output from the host computer 11 and the external machines 12 and 13, and outputs the internal vertical synchronizing signal 281, the internal horizontal synchronizing signal 282, and the internal clock signal 283. The internal clock signal 283 is output as the video clock signal 46. The horizontal area counter 272 counts the internal clock signals 283 to the setup value FSA, outputs the horizontal area start signal 285, and activates and counts the horizontal direction area signals. The comparator 273 compares the value of the horizontal area counter 272 with the active width indicated by the setup value FWIA and when they become equal, the horizontal direction area signal is deactivated. The vertical area counter 274 counts the rising edge detection signals 284 of the internal horizontal synchronizing signal 282 to the setup value SSA, outputs the vertical area start signal 286, and activates and counts the vertical direction area signals. The comparator 275 compares the value of the vertical area counter 274 with the active width indicated by the setup value SWIA and when they become equal, the vertical direction area signal is deactivated.

An example of the operation in the second embodiment of the image processing apparatus of the invention will be discussed. Here, four blocks of the configuration surrounded by the broken line in FIG. 2 are provided in parallel and are used for three colors and black. From the central processing unit 29, the 32-bit data bus 62 and the control signals 63 are connected to the image memory access controllers. To read/write data from/into the internal storage unit 71, eight bits of the 32-bit data bus 62 (for example, bits 0 to 7) and a register chip select signal, a read signal, a write signal, and an address of the control signals 63 are used. The slave IMAC enable input signal of the master image memory access controller 22 is connected to GND, the slave IMAC enable output signal is connected as the control signal 53 to the slave IMAC enable input signal of the slave image memory access controller 23, the master buffer enable signal is connected to enable terminals of the bidirectional buffer 26 and the bus buffer 24 as the enable signal 55, and the buffer direction signal 54 is connected to a DIR terminal of the bidirectional buffer 26. The slave buffer enable signal of the slave image memory access controller 23 is connected to an enable terminal of the bus buffer 25. Further, the slave buffer enable signal of the master image memory access controller 22 and the master buffer enable signal and buffer direction signal of the slave image memory access controller 23 are left open.

1. Preparation for image memory access controller operation

First, reset of each image memory access controller is released, because all values in the storage unit 71 are '0' and setup values cannot be written in the reset state when the power is turned on. When reset is released, the image memory access section 77 starts the operation and places the memory control signal 59, 60 in a refresh cycle. This refresh cycle is a CAS before RAS refresh cycle, for example.

Next, the 2-chip or 1-chip mode is selected. In the 1-chip mode, in the storage unit 71 of the master image memory access controller 22, '1' is set in the setup value MSTSLV and '0' is set in the setup value EXTSLV shown in FIG. 5, and '0' is set in the setup values MSTSLV and EXTSLV of the slave image memory access controller 23, whereby the master buffer enable signal (enable signal 55) and the slave IMAC enable output signal (control signal 53) of the master image memory access controller 22 are set to '0' and the slave buffer enable signal (enable signal 56) of the slave image memory access controller 23 is set to '1,' enabling the master image memory access controller 22 to access both the image memories 27 and 28.

In the 2-chip mode, '1' is set in the setup values MSTSLV and EXTSLV of the master image memory access controller 22, and '0' is set in the setup values MSTSLV and EXTSLV of the slave image memory access controller 23, whereby the master buffer enable signal (enable signal 55) and the slave IMAC enable output signal (control signal 53) of the master image memory access controller 22 are set to '1' and the slave buffer enable signal (enable signal 56) of the slave image memory access controller 23 is set to '0,' enabling the master image memory access controller 22 to access the image memory 27 and the slave image memory access controller 23 to access the image memory 28 separately.

To make direct image memory access from the central processing unit 29, '1' is set in the setup value CEN shown in FIG. 6. While '1' is set in the setup value CEN, the memory chip select signal, read signal, write signal, byte enable signal, and address of the control signals 63 from the central processing unit 29 are used to input/output data on the 32-bit CPU data bus. At the write time, data on the data bus 62 is sent through the DMA control circuit 142 to the data control circuit 145 as the direct write data 158. In the data control circuit 145 shown in FIG. 6, the data selection circuit 173 selects the direct write data 158 according to the setup value CEN and outputs the selected data to the memory data bus 57, 58 as the memory write data 187 for writing the data into the image memory 27, 28. When the data has been written into the image memory, a NACK signal is returned to the central processing unit 29 as the response signal 54. At the read time, data from the image memory 27, 28 is output from the memory data bus 57, 58 through the DMA control circuit 142 to the data bus 62. When the data has been read from the image memory, NACK and NRDCEN signals are returned to the central processing unit 29 as the response signal 54.

Filling for writing of predetermined fixed-value data, increment data, or decrement data into one area of the image memory 27 or 28, verifying for writing of predetermined fixed-value data into one area of the image memory 27 or 28, then reading the written value and checking to see if the write data and read data equal, or copying for reading data written into one area of the image memory and writing the data into an area other than the original data write area is executed in the asynchronous mode for accessing independently of the area signal.

In the asynchronous mode, access position information such as the horizontal and vertical direction widths of the image memory, the image area start point and widths in the horizontal and vertical directions in the image memory, and travel distances in the horizontal and vertical directions at the copying time and write time is set and '1' is set in any one or more of the setup values COPY, VER, and FILL. At the copying time, the setup value CPDIR for setting the copying direction is also set. In filling, PTN indicating the fixed value to be written and the setup value INCDEC for setting increment or decrement are also set.

To copy in a minus direction relative to a source image area address as an example, '1' is set only in the setup value COPY; to copy in a plus direction, '1' is set in the setup value CPDIR as well as the setup value COPY. To verify, '1' is set only in the setup value VER. To fill with fixed-value data, '1' is set in the setup value PTN as well as the setup value FILL. To fill with increment data, '1' is set in the setup value INCDEC as well as the setup value FILL. To fill with decrement data, '1' is set only in the setup value FILL. Further, to fill, a value is also set in the setup value FP for setting a fill pattern; to copy, a value is also set in the setup value NUMCP for setting the number of copy times.

Then, '1' is set in the setup value CALSRT for converting position information represented by XY coordinates into physical addresses. At this time, the address conversion section 74 shown in FIG. 3 calculates the origin address of a source image area, four corners of a destination image area, and the distance from the source image area to the destination image area at the copying time based on setup values.

Figure 9:
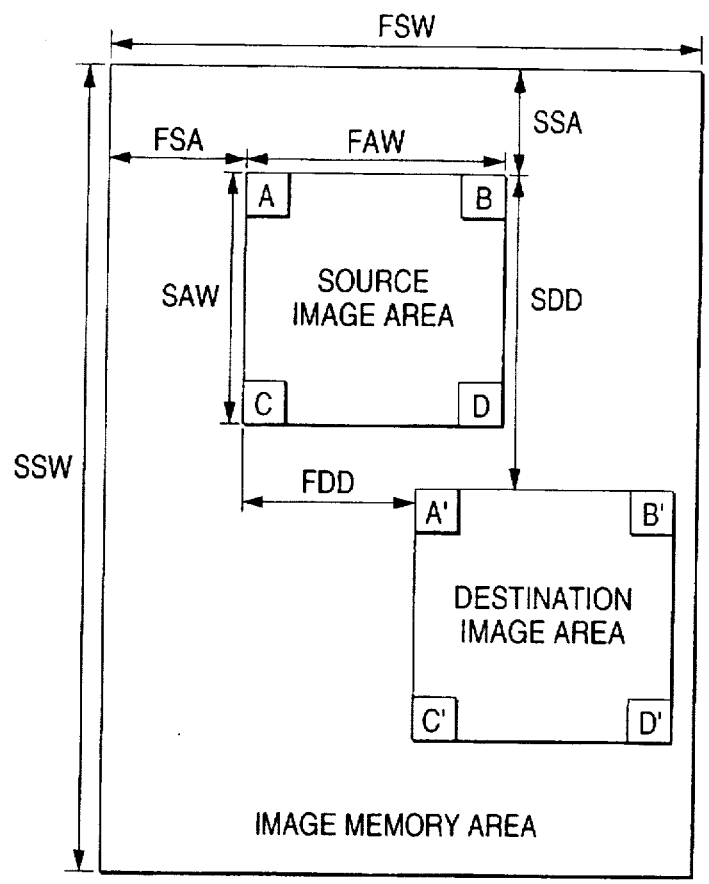
FIG. 9 is an illustration of image areas.

FIG. 9 is an illustration of image areas. Consider a source image area surrounded by points A, B, C, and D and a destination image area surrounded by points A', B', C', and D'. The widths in the horizontal and vertical directions of the image memory are FSW and SSW, the horizontal and vertical positions of the start point A of the source image area are FSA and SSA, and the area widths in the horizontal and vertical directions are FAW and SAW. The horizontal and vertical positions of the start point A' of the destination image area are indicated by the distances from the start point A of the source image area, and the distances in the horizontal and vertical directions are FDD and SDD.

The setup values shown in FIG. 9 are used to calculate the origin address of the source image area, the four corners of the destination image area, and the distance from the source image area to the destination image area at the copying time. The calculation expressions for the values are given as Address of point A=FSW×SSA+FSA Address of point A'=FSW×(SSA+SDD)+FSA+FDD Address of point B'=FSW×(SSA+SDD)+FSA+FDD+FAW Address of point C'=FSW×(SSA+SDD+SAW)+FSA+FDD Address of point D'=FSW×(SSA+SDD+SAW)+FSA+FAW+FDD Distance between points A and A'=FSW×SDD+FDD At the completion of all calculations, the address conversion section 74 activates the address conversion termination signal 107 indicating the conversion termination and clears the setup value CALSRT to '0.' It selects one of the calculated four corner addresses of the destination image area in response to the combination of the setup value ROT of a rotation angle at the rotation processing time, the setup values XMIR and YMIR for enabling image mirror processing in the horizontal and vertical directions, and the setup value RW for setting the directions of the memory data bus and the image data bus, and outputs the selected address as the destination initial address 95. Also, the address conversion section 74 outputs the address of the point A of the source image area as the source initial address 96. Further, it outputs the distance between the points A and A' as the image area distance 97 to the load data generation section 75. The central processing section 29 polls the setup value CALSRT. After checking to ensure that the setup value is set to '0,' the central processing section 29 sets '1' in the setup value for enabling the operation.

In the area synchronous mode, the image memory can be accessed in either a read/write cycle or fast page mode cycle. When the image memory is accessed in the read/write cycle, '1' is set in the setup value PEN; when the image memory is accessed in the fast page mode cycle, '1' is set in the setup value IEN. After this, as in the asynchronous mode, the position information represented by XY coordinates is converted into physical addresses and a check is made to ensure that the setup value CALSRT is set to '0,' then '1' is set in the setup value SRT.

2. Refresh cycle

In the refresh cycle generation circuit 141 shown in FIG. 5, the refresh stop signal 83 is output from the control section 72. When the signal is '0,' generation of a refresh cycle is suppressed. The access synchronizing signal 106 is a new internal synchronizing signal generated based on the setup value in the storage unit 71. It is output from the image memory access section 77 and is also input to the refresh cycle generation circuit 141. At the reset time, the refresh stop signal is set to '1' and the access synchronizing signal is set to '0.' When reset is released, the memory chip select signal is set to '1.' After reset is released, the internal counter starts counting. When a predetermined value is reached, the counter outputs a carry signal. The refresh RAS signal 151, the refresh CAS signal 152, and the refresh cycle signal 153 are output based on the carry signal.

3. CPU direct image memory access

In the DMA control circuit 142 shown in FIG. 5, the access method to the image memory is automatically changed depending on the value of the byte enable signal when the memory chip select signal and the read or write signal become active. The byte enable signal is decoded for selecting access in byte, halfword, or word units.

The data bus 62 from the central processing unit 29 is a 32-bit bus and addresses become multiples of four like 0 (h), 4 (h), 8 (h), . . . For example, assuming that the image memory has a capacity of 16 Mbytes, the 32-Mbyte image memory space assumed to be one chip must be accessed in the 1-chip memory. Therefore, the CPU address requires 23 bits. To access the image memory in byte or halfword units, the low-order 2-bit address part is again generated by encoding the four byte enable signals for conversion to an internal 25-bit address.

To make direct image memory access, the setup value CEN is set to '1,' as described above. When the memory chip select signal and either the read or write signal are set to '0,' if the refresh cycle signal 153 is '0,' the direct RAS signal 155 and the direct CAS signal 156 are set to '1' at a predetermined timing according to the DMA control circuit 142 immediately if the refresh cycle signal is '1' after the refresh cycle signal 153 changes to '1.'

When data is written into the image memory 27, 28, the direct WE signal 157 is set to '0' and data on the data bus 62 of the central processing unit 29 is latched. After this, the data is transferred eight bits at a time as the direct write data 158 according to the value of the low-order address 154. At this time, when the low-order address is 0 (h), the low-order eight bits of the data bus 62 are used as the direct write data 158; when the low-order address is 1 (h), the subsequent eight bits of the data bus 62 are used as the direct write data 158; when the low-order address is 2 (h), the furthermore subsequent eight bits of the data bus 62 are used as the direct write data 158; when the low-order address is 3 (h), the high-order eight bits of the data bus 62 are used as the direct write data 158. The direct WE signal 157, the direct RAS signal 155, the direct CAS signal 156, the low-order address 154, and the CPU address control signals of the control signals 63 form the central processing unit 29 are selected by the control signal selection circuit 144 and the direct write data 158 is written into the image memory 27, 28 based on the signals.

When data is read from the image memory 27, 28, read data on the memory data bus 57, 58 is latched to a proper position on the data bus 62 addressed by the low-order address and is output. For example, when the low-order address is 0 (h), the latched data is output to the low-order eight bits of the data bus 62; when the low-order address is 1 (h), the latched data is output to the subsequent eight bits of the data bus 62; when the low-order address is 2 (h), the latched data is output to the furthermore subsequent eight bits of the data bus 62; when the low-order address is 3 (h), the latched data is output to the high-order eight bits of the data bus 62.

To access the image memory in halfword or word units, an internal low-order address is generated. For example, to access the image memory in halfword units, the low-order address is changed from 0 (h) to 1 (h) or from 2 (h) to 3 (h). To access the image memory in word units, the low-order address is changed from 0 (h) to 1 (h) to 2 (h) to 3 (h). The write operation and write operation are performed in a similar manner.

4. Asynchronous mode 4-1. Filling

The filling will be discussed in order starting at the operation of the control section 72. In the configuration of the control section 72 shown in FIG. 4, the reference clock selection circuit 111 selects the command clock signal 84 in the asynchronous mode from the input video clock signal 46 and command clock signal 84 and outputs the command clock signal 84 as the reference clock signal 85. When the setup value SRT indicating operation enable is set to '1,' the rising edge detection circuit 113 detects the rising edge of SRT and outputs an SRT rising edge detection signal 121 with one command clock cycle as the duration of '1.' The detection signal selection circuit 114 selects the SRT rising edge detection signal 121 and outputs the signal as the horizontal direction start signal 125, refresh mask signal 131, vertical direction start signal 126 with one clock cycle as the duration of '1.'

The refresh mask signal 131 is a signal for suppressing refresh cycle occurrence immediately before a read/write cycle or fast page mode cycle occurs so that the read/write cycle or fast page mode cycle and a refresh cycle do not occur at the same time when the image memory access section 77 generates the NRAS signal, NCASL signal, NCASH signal in the area synchronous mode. The refresh mask signal 131 is NANDed with the vertical direction reference synchronizing signal 81 and is output to the refresh cycle generation circuit 141 of the image memory access section 77 as the refresh stop signal 83.

When the horizontal direction start signal is set to '1,' the enable signal of the pixel counter 115 is set to '1,' starting counting the reference clock signal 85. When the setup value SRT is '0,' load data for setting the duration of '0' of the horizontal direction reference synchronizing signal 82 is loaded into the pixel counter 115. Thus, the pixel counter 115 starts counting the reference clock signal 85 at the load data. When the pixel counter 115 continues counting and the count reaches ffff (h), the pixel counter 115 outputs a carry signal. The start signal selection circuit selects the carry signal and outputs the signal as a horizontal start point signal. When the horizontal start point signal is set to '1,' '1' is output to the horizontal direction reference synchronizing signal 82. When the pixel counter 115 furthermore continues counting and the count becomes the same value as the horizontal direction image width 127 output from the image area width selection circuit 112, the horizontal direction reference synchronizing signal 82 is set to '0' and 1-line processing is complete. At this time, the value of the setup value FAW is output to the horizontal direction image width 127.

When the horizontal direction reference synchronizing signal 82 is set to '0,' the internal synchronizing signal falling edge detection circuit 119 detects the falling edge of the signal and outputs a load clock signal 87 with one clock cycle as the duration of '1' and a horizontal direction falling edge detection delay signal 129 delayed by latching the load clock signal 87 several times by the reference clock signal 85. When the horizontal direction falling edge detection delay signal 129 is output, load data is again loaded into the pixel counter 115 and the above-described processing is repeated. The horizontal direction reference synchronizing signal 82 is output to the image memory access section 77.

On the other hand, when the vertical direction start signal 126 is set to '1,' the value of the line counter 116 is incremented each time the load clock signal 87 is set to '1' and at the same time, '1' is output to the vertical direction reference synchronizing signal 81. When the setup value SRT is '0,' the line counter 116 is reset, thus starts counting at 0. When the line counter 111 continues counting and the count becomes the same value as the vertical direction image width 128 output from the image area width selection circuit 112, the vertical direction reference synchronizing signal 81 is set to '0' and 1-page processing is complete. At this time, the value of the setup value SAW is output to the vertical direction image width 128.

When the vertical direction reference synchronizing signal 81 is set to '0,' the internal synchronizing signal falling edge detection circuit 119 detects the falling edge of the signal and outputs a vertical direction falling edge detection signal 86 with one clock cycle as the duration of '1' and a vertical direction falling edge detection delay signal 130 delayed by latching the vertical direction falling edge detection signal 86 several times by the reference clock signal 85. The vertical direction falling edge detection signal 86 is selected by the termination signal selection circuit and passes through a J-K flip-flop, then becomes the processing termination signal 66, loading load data into the pixel counter 115 and resetting the line counter 116.

The FIFO control circuit 172 provided in the data control circuit 145 of the image memory access section 77 selects either the input horizontal direction reference synchronizing signal 82 or a delay synchronizing signal provided by latching the horizontal direction reference synchronizing signal 82 several times by the reference clock signal 85 and outputs the selected signal as an access synchronizing signal. When the access synchronizing signal is '1,' the memory control signal generation circuit 143 generates the regular RAS signal 162, the regular CAS signal CAS signal 163, and the regular WE signal 164.

On the other hand, since the load clock signal 87 is '0' in the initial state, the load data generation section 75 outputs the source initial address 96 from the address conversion section 74 to the address generation section 76 as the S load address 101 and sets the S address enable signal 98 to '0' and at the same time, outputs the access synchronizing signal 106 to the S counter enable signal 100. At the termination of 1-line filling, the load clock signal 87 is set to '1' only for one clock cycle and an S addition address resulting from adding the S load address value and the value of the setup value FSW is output to the address generation section 76 as a new S load address 101. After this, likewise, each time 1-line processing terminates, the new S load address 101 is updated and the filling is continued until the vertical direction reference synchronizing signal 81 is set to '0.'

Since the addition address selection signal 93 is '0,' the internal address 103 output from the address generation section 76 is used as a count from the S load address 101. Therefore, when the access synchronizing signal 106 is set to '1,' counting is started at the value of the S load address 101 and the value is output to the control signal selection circuit 144 of the image memory access section 77 as the internal address 103.

The control signal selection circuit 144 selects the address bus of the central processing unit 29 and the internal address 103 according to the value of the setup value CEN. When the NRAS signal is '1,' the control signal selection circuit 144 outputs the high-order 12 bits of the selected address; when the NRAS signal is '0,' if the setup value CEN is '1,' the control signal selection circuit 144 outputs the low-order 10 bits of the address bus of the central processing unit 29 and the low-order address 154 output from the DMA control circuit 142; or if the setup value CEN is '0,' the control signal selection circuit 144 outputs the low-order 12 bits of the internal address 103.

In the data control circuit 145, when the filling is performed, the FILL data 189 of an output value of the fill counter 174 is selected by the data selection circuit 173 and becomes the memory write data 187. For fixed-value filling, the fill counter 174 outputs the value set in the FP register. For increment filling, the fill counter 174 outputs increment data with the value set in the setup value FP as an initial value. For decrement filling, the fill counter 174 outputs decrement data with the value set in the setup value FP as an initial value.

At this time, the page mode WE signal 161 output from the memory control signal generation circuit 143 and the direct WE signal 157 output from the DMA control circuit 142 are '1,' thus the regular WE signal 164 is output as the NWE signal. Likewise, the regular RAS signal 162 is output for the NRAS signal. The regular CAS signal 163 is output to one of the NCASL and NCASH signals and '1' is output to the other based on the value of the most significant bit of the internal address 103 or the address of the central processing unit 29.

When the access synchronizing signal is '0,' the regular RAS signal and the regular CAS signal are '1,' thus the refresh RAS signal and the refresh CAS signal are output to the NRAS signal, NCASL signal, and NCASH signal.

As discussed above, when the internally generated access synchronizing signal is '1,' filling is performed. When the access synchronizing signal is '0,' a refresh cycle is entered for holding the written data. When the operation is repeated and 1-page filling is complete, the internal synchronizing signal falling edge detection circuit 119 of the control section 72 sets the vertical direction falling edge detection signal 86 to '1' only for one clock cycle. The vertical direction falling edge detection signal 86 is output '0' to the processing termination signal through the termination signal selection circuit, and the operation is complete.

4-2. Verifying

The verifying is processing for writing a value set in the FP register into the image memory, reading data at the same address as the value was written, and comparing the write data with the read data to see if they match. Therefore, the address changes every two clock cycles and a read cycle and a write cycle occur alternately. The NRAS signal, NCASL signal, NCASH signal, and memory address operate as in the filling described above and therefore will not be discussed again.

When the access synchronizing signal 106 from the image memory access section 77 is set to '1,' the load data generation section 75 outputs the S address enable signal 98 and the S counter enable signal 100 having a value changing between '0' and '1' every clock cycle to the address generation section 76. Likewise, the memory control signal generation circuit 143 of the image memory access section 77 also generates the read/write change signal 165 having a value changing between '0' and '1' every clock cycle and outputs the signal intact to the data control circuit 145 and as the regular WE signal 164 to the control signal selection circuit 144.

In the verifying, first a value is written into the image memory 27, 28, then data is read. Thus, the initial value of the read/write change signal 165 becomes '0.' The address generation section 76 outputs increment data having the S load address 101 as an initial value every two clock cycles according to the S counter enable signal 100. The value becomes the internal address 103, passes through the control signal selection circuit 144 in the image memory access section 77, and becomes a memory address.

On the other hand, when the NWE signal selected by the control signal selection circuit 144 is '0,' the FILL data 189 is selected by the data selection circuit 173 of the data control circuit 145 and is output to the memory data bus 57, 58. When NWE signal is '1,' data on the memory data bus 57, 58 is latched by the CAS clock signal 166 and is compared with the setup value FP by the comparator 175.

The output timing of the CAS clock signal 166 can be set considering that the delay time of data output from the image memory changes due to the delay time of the bidirectional buffer or the bus buffer connected between the image memory access controller and the image memory and that the write timing into the internal FIFO changes.

If the data and the setup value FP match as a result of the comparison of the comparator 175, the comparator 175 outputs '1,' and '0' is output as the error signal. If they do not match as a result of the comparison of the comparator 175, the comparator 175 outputs '0,' and '1' is output as the error signal. When the value of the error signal input while the setup value SRT is '1' is set to '1,' the control section 72 holds the value and outputs it to the storage unit 71 as the error sensing signal 90.

When the operation is repeated and 1-page verifying terminates, as in the filling, the vertical direction falling edge detection signal 86 is set '1' and the processing termination signal is output '0,' then the operation is complete.

4-3. Copying

The copying is processing for reading one previously written data piece in one area in the image memory (source image area) and writing the data piece into another area (destination image area). As in the verifying, a source image area address and a destination image area address change every two clock cycles and a read cycle and a write cycle occur alternately. The NRAS signal, NCASL signal, NCASH signal, and memory address operate as in the filling and therefore will not be discussed again.

When the access synchronizing signal 106 is set to '1,' the load data generation section 75 outputs the S address enable signal 98 and the S counter enable signal 100 having a value changing between '0' and '1' every clock cycle to the address generation section 76. It also outputs a delay signal provided by latching the S counter enable signal 100 once by the reference clock signal 85 to the address generation section 76 as the D counter enable signal 99.

Likewise, the memory control signal generation circuit 143 of the image memory access section 77 also generates the read/write change signal 165 having a value changing between '0' and '1' every clock cycle and outputs the signal to the control signal selection circuit 144 as the regular WE signal 164.

For the S load address 101 output from the load data generation section 75, when processing of the first line is performed, the value of the source initial address 96 is output, then a setup value is added each time 1-line processing terminates, as described in the filling. Since the initial value of the vertical direction falling edge detection signal 86 is set '0,' the destination initial value 95 output from the address conversion section 74 is output to the D load address 102. After this, like the S load address 101, addition data is added each time 1-line processing terminates. At the termination of 1-page copying, the vertical direction falling edge detection signal 86 is set '1' only for one clock cycle and if the value of the setup value CPDIR indicating the copying direction is '0,' the value resulting from subtracting the image area distance from the destination initial address 95 is output to the D load address 102; if the value of the setup value CPDIR is '1,' the addition address is output to the D load address 102. When the vertical direction falling edge detection signal 86 is set '1,' the S load address 101 is reset and the value of the source initial value 96 is output. Then, a setup value is added in a similar manner.

In response to the D counter enable signal 99 and the S counter enable signal 100, the D load address 102 and the S load address 101 are set to initial values and change every two clock cycles in the address generation section 76. Since the S address enable signal 98 changes between '0' and '1' every clock cycle, the source and destination image area addresses are output alternately for the internal address 103. Further, at the termination of 1-page copying, the addition/subtraction address of the image area distance to the copy addition address is output to the D load address 102. Then, addition data is added in a similar manner. The load data generation section 75 has a copy counter. At the termination of copying as many times as the setup number of copy times, a carry signal is set to '1.' When the carry signal is '1' and the vertical direction falling edge detection signal 86 is '1,' the copy termination signal 88 is output '1.' The control section 72 outputs the copy termination signal 88 '0' to the processing termination signal through the termination signal selection circuit, and completes the operation.

5. Area synchronous mode

To write image data from the external machine 12, 13 or the host computer 11 into the image memory 27, 28, which will be hereinafter referred to as memory write operation, or read data from the image memory 27, 28 and transfer the data to the external machine 12, 13 or the host computer 11, which will be hereinafter referred to as memory read operation, predetermined values need to be set in the storage units of the data selector 18, 19, the area signal generator 17, and the data bus controller 20, 21 before preparation for the image memory access controller operation is executed.

5-1. Initialization

Input/output to/from the bidirectional data bus of the data selector 18, 19 is controlled according to the value set in the storage unit of the data selector 18, 19. When the power is turned on, the setup value is reset to 0 (h) and all data buses enter an input mode. In the memory write operation, the image data bus 38, 39 on the side of the external machine 12, 13 (the bus is called the EX data bus in the description of the data selector) becomes input and the image data bus 47, 48 on the side of the data bus controller 20, 21 (the bus is called IN data bus A, B in the description of the data selector) becomes output. In the memory read operation, the IN data buses A and B become input and the EX data bus become output and either the IN data buses A or B is selected. When the EX data bus is output, the clock signal corresponding to the selected data bus is selected from among the input clock signals and the image data is latched internally by the selected clock signal for synchronization. The used clock signal is output as a return clock signal. The vertical and horizontal synchronizing signals corresponding to the selected data bus are selected from among the input vertical and horizontal synchronizing signals and are output as return vertical and horizontal synchronizing signals. If '0' is set in the DTSEL bit and '0' is set in the SYNCS bit, vertical synchronizing signal A1 and horizontal synchronizing signal A1 are selected and are output as return vertical and horizontal synchronizing signals. The return clock signal and return vertical and horizontal synchronizing signals are return synchronizing signals 43 and 44.

In the area signal generator 17 shown in FIG. 8, like the data selector 18, 19, the bits of the internal storage unit 243 are reset to 0 (h) when the power is turned on. Thus, '1' is set in the setup value NRST for releasing the internal reset state. Next, area signal occurrence positions and area signal active widths are set as the setup values FSA, FWIA, SSA, and SWIA. Since the area signal 45 is generated with an input synchronizing signal as the reference, a predetermined value is set as the setup value ASEL to select the synchronizing signal as the reference.

When the memory write or read operation is performed, the image data input/output format, which will be hereinafter referred to as color mode, varies depending on the host computer 11 and the external machine 12, 13. For example, if 1-pixel data of each of R, G, and B is eight bits, the simultaneous 24-bit input/output format, which will be hereinafter referred to as monochrome mode, is available; if 1-pixel data of each of Y, M, and C is eight bits, the format of inputting/outputting Y, M, C data in plane order, which will be hereinafter referred to as 3-color mode, is available; if 1-pixel data of each of Y, M, C, and K is eight bits, the format of inputting/outputting Y, M, C K data in plane order, which will be hereinafter referred to as full color mode, is available. Since the enable signal 64 is a signal for enabling the operation of the master image memory access controller 22, 23, the output manner differs depending on the color mode. Then, the color mode when the memory write or read operation is performed is set as the setup value CLMD. For example, 0 (h) is set in the setup value CLMD in the monochrome mode; 2 (h) is set in the 3-color mode; 3 (h) is set in the full color mode.

The enable signal 64 is not output unless '1' is set in the setup value SRT. Like the area signal 45, the enable signal 64 is also generated with an input synchronizing signal as the reference, a predetermined value is set in the setup value ESEL to select the synchronizing signal as the reference. The setup value at the selection time is similar to the setup value ASEL and therefore will not be discussed again.

The output timing of the enable signal 64 is set in the setup value PR by using the vertical synchronizing signal selected in the setup value ESEL as the reference. For example, if the enable signal 64 enables the operation of the master image memory access controller 22, 23 only when the vertical synchronizing signal selected in the setup value ESEL becomes active at the first time, the setup value may be set to 0 (h); if the enable signal 64 enables the operation when the vertical synchronizing signal becomes active at the second time, the setup value may be set to 1 (h); if the enable signal 64 enables the operation when the vertical synchronizing signal becomes active at the third time, the setup value may be set to 2 (h).

Input/output to/from the bidirectional data bus of the data bus controller 20, 21 is controlled according to various setup values set in the storage unit 193. In the memory write operation, the EX data bus A, B becomes input and the IN data bus A, B becomes output. To place the IN data bus A, B in the output mode, '1' is set in the setup value INDIO corresponding to the data bus. However, the value of the setup value INDIO is ignored unless '1' is set in the setup value INEN. To select data output from the IN data bus A, B and a synchronizing signal with which the data synchronizes at the output time, predetermined values are set in the setup values ODSI and SELI. For example, if data from the EX data bus A is output, '0' is set in the setup value ODSI or if data from the EX data bus B is output, '1' is set in the setup value ODSI. If image data synchronizes with horizontal direction area signal A and vertical direction area signal A, '0' is set in the setup value SELI; when image data synchronizes with horizontal direction area signal B and vertical direction area signal B, '1' is set in the setup value SELI.

On the other hand, in the memory read operation, the IN data bus A, B becomes input and the EX data bus A, B becomes output. To place the EX data bus A, B in the output mode, '1' is set in the setup value EXDIO corresponding to the data bus. However, the value of the setup value EXDIO is ignored unless '1' is set in the setup value EXEN. To select data output from the EX data bus A, B and a synchronizing signal with which the data synchronizes at the output time, predetermined values are set in the setup values ODSO and SELO. For example, if data from the IN data bus A is output, '0' is set in the setup value ODSO or if data from the IN data bus B is output, '1' is set in the setup value ODSO. If image data synchronizes with horizontal direction area signal A and vertical direction area signal A, '0' is set in the setup value SELO; when image data synchronizes with horizontal direction area signal B and vertical direction area signal B, '1' is set in the setup value SELO.

5-2. Read/write cycle

The memory write operation will be discussed. When the initialization and the preparation for the image memory operation are complete as described above and the synchronizing signals 34–36 are output from the host computer 11 and the external machine 12, 13, the area signal generator 17 and the data selector 15, 16 start the operation. The data selector 15 outputs image data from the external machine 12, 13 to the data bus controller 20, 21 in accordance with the setup value in the internal storage. The area signal generator 17, which inputs the synchronizing signals 34–36 from the host computer 11 and the external machine 12, 13, starts outputting the area signal 45 consisting of the horizontal and vertical direction area signals, the enable signal 64, and the video clock signal 46.

The area signal generation circuit 242 of the area signal generator 17 selects one from among synchronizing signals according to the setup value in the storage unit 243 and uses the selected synchronizing signal as the internal clock signal 283, internal horizontal synchronizing signal 282, and internal vertical synchronizing signal 281. The internal clock signal 283 is output as the video clock signal 46. In the reset state, complements to the values of the setup values FSA and SSA are loaded into the horizontal and vertical area counters 272 and 273, respectively, in the area signal generation circuit 242.

When reset is released and the internal horizontal synchronizing signal 282 is set to '1,' the horizontal area counter 272 starts counting at the complement to the value of the setup value FSA. When the count reaches 1fff (h), the horizontal area start signal 285 is set to '1' and '1' is output to the horizontal direction area signal. When the horizontal area counter 272 furthermore counts and the count matches the value of the setup value FWIA, the horizontal direction area signal is set to '0' by an output signal of the comparator 273. After this, such operation is repeated each time the internal horizontal synchronizing signal 282 is set to '1,' generating the horizontal direction area signal.

When reset is released and the rising edge detection signal 284 of the internal horizontal synchronizing signal 282 is set to '1,' the vertical area counter 274 starts counting. When the internal vertical synchronizing signal 281 is set to '1' and the rising edge detection signal of the internal horizontal synchronizing signal is set to '1,' the vertical area counter 274 executes counting. When the count reaches 1fff (h), the vertical area start signal 286 is set to '1' and '1' is output to the vertical direction area signal. When the vertical area counter 274 furthermore counts and the count matches the value of the setup value SWIA, the vertical direction area signal is set to '0' by an output signal of the comparator 275 and 1-page processing is complete. After this, such operation is repeated each time the internal vertical synchronizing signal 281 is set to '1' and the rising edge detection signal 284 of the internal horizontal synchronizing signal 282 is set to '1,' generating the vertical direction area signal.

On the other hand, also in the enable signal generation circuit 241 of the area signal generator 17, the synchronizing signal selection circuit A 251 selects one from among synchronizing signals according to the setup value in the storage unit 243 and uses the selected synchronizing signal as the internal clock signal 262 and internal vertical synchronizing signal 261. The page counter 252 is counted when the falling edge of the internal vertical synchronizing signal 261 is detected, and is reset at a predetermined timing according to the value of the setup value CLMD. The comparator 254 compares the output value of the page counter 252 with the value of the setup value PR. When they match, the comparator 254 outputs '1' as the enable signal 64.

The data bus controller 20, 21 selects either image data on the EX data bus A or image data on the bus B connected to the data selector 18, 19 according to the setup value in the storage unit 193 and outputs the selected image data to the IN data bus A, B connected to the image memory access controller 22, 23 in synchronization with the horizontal direction area signal, vertical direction area signal, video clock signal 46 selected according to the setup value in the storage unit 193. When the internal area signal 215 generated from the selected horizontal direction area signal, vertical direction area signal is '0,' the value set in the setup value IDVIN is output to the IN data bus A, B.

When the enable signal 64 and the horizontal direction area signal, vertical direction area signal are set to '1,' the control section 72 of the image memory access controller 22, 23 selects the video clock signal 46 as the reference clock signal 85 and generates the horizontal direction reference synchronizing signal 82, vertical direction reference synchronizing signal 81 based on the horizontal direction rising edge detection signal 122, vertical direction rising edge detection signal 123 of a rising edge detection signal of the horizontal direction area signal, vertical direction area signal. The image memory access section 77 latches the horizontal direction reference synchronizing signal 82 several times by the reference clock signal 85, generating the access synchronizing signal 106. When the access synchronizing signal 106 is '1,' the image memory access section 77 generates the NRAS signal, NCASL signal, NCASH signal, NWE signal, and address.

The address generation section 76 generates an internal address in accordance with the values of the horizontal direction addition signal 91, the count-up signal 92, and the addition address selection signal 93 from the decoding section 73 and outputs the address to the image memory access section 77; a memory address is output by performing processing as in the filling.

Data on the image data bus 49, 50 is output to the internal FIFO through the FIFO data control circuit 172 in the data control circuit 145 of the image memory access section 77 for sequential write. The written data is read in sequence based on the CAS clock signal 166 output from the control signal selection circuit 144. The read FIFO output data 185 is selected by the data selection circuit 173, is output onto the memory data bus 57, 58, and is written into the image memory 27, 28.

The operation is repeated each time the access synchronizing signal 106 is '1,' whereby image data from the external machine 12, 13 or the host computer 11 can be written into the image memory 27, 28. At the termination of 1-page processing, as in the asynchronous mode, the vertical direction reference synchronizing signal 81 is set to '0' and the memory write operation is complete.

The memory read operation basically is almost similar to the memory write operation and therefore will not be discussed in detail. However, the differences from the memory write operation will be shown below:

The data bus input and output directions in the data selectors 18 and 19 and the data bus controllers 20 and 21 become opposite to those at the memory write operation time. The data bus controller 20, 21 selects one from among the synchronizing signals 51, 52 output from the image memory access controller 22, 23 and outputs image data synchronized with the selected synchronizing signal. When the synchronizing signal is '0,' the value of the setup value IDVEX is output. The FIFO data control circuit 172 of the image memory access controller 22, 23 writes data on the memory data bus 57, 58 into the FIFO and outputs the data read from the FIFO to the image data bus 49, 50 as it is.

Figure 10A:
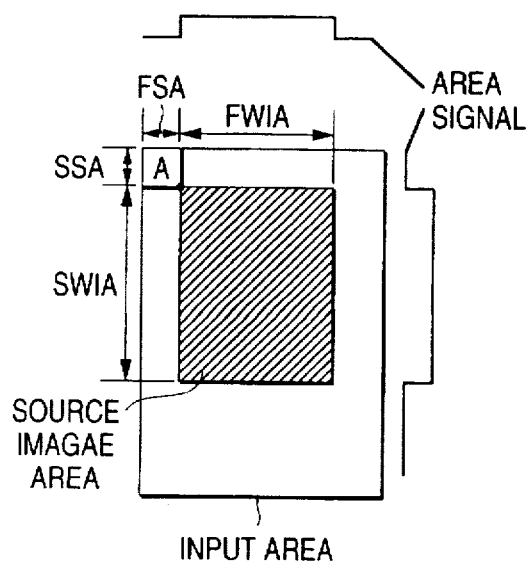
FIGS. 10A and 10B are illustration of an example of moving.
Figure 10B:
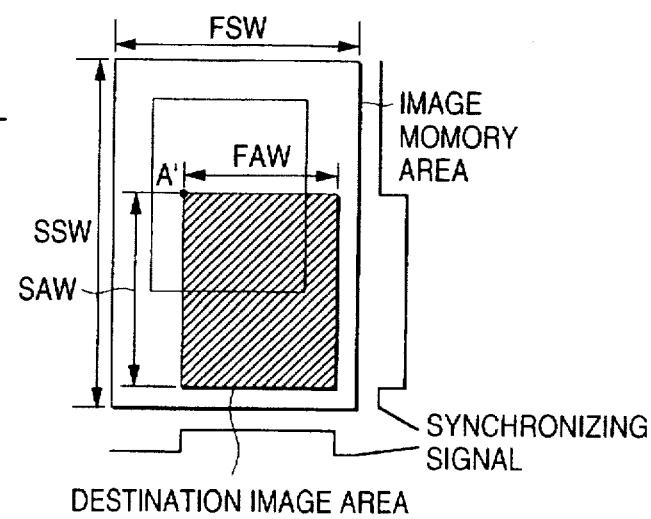

In the memory write operation and the memory read operation, conversion processing such as moving, mirror image processing, and rotation can be performed. First, the moving can be performed by using the above-described D load address 102. FIGS. 10A to 10D are illustration of an example of the moving. As shown in FIG. 10A, the source image area hatched by the area signal 45 is separated from the area of image data input from the external machine 12, 13, etc. The address conversion section in the image memory access controller 22, 23 outputs the address of point A' in FIG. 10B as the destination initial address 95 and the address is also output from the D load address 102 in the initial state. Each time 1-line processing terminates, the setup value FSW of the horizontal direction width of the image memory area is added and the addition result is output to the address generation section 76 as the D load address 102. While the D counter enable signal 99 is '1,' the address generation section 76 counts up with the D load address 102 as the initial value, and the count becomes the address for the image memory 27, 28. Moving is enabled by performing such processing of counting up the address with the addition result value of the setup value FSW for each line as the top address of each line of the destination image area while the horizontal direction reference signal is '1.'

Mirror image processing and rotation can also be performed. Here, horizontal and vertical direction mirror image processing can be performed and 90°, 180°, and 270° rotations can be performed. They can be performed in combination. FIGS. 11A to 18D are illustrations of examples of the mirror image processing and rotation. FIGS. 11A to 14D show the mirror image processing and rotation at the write time and FIGS. 15A to 18D show the mirror image processing and rotation at the read time.

Figure 11A:
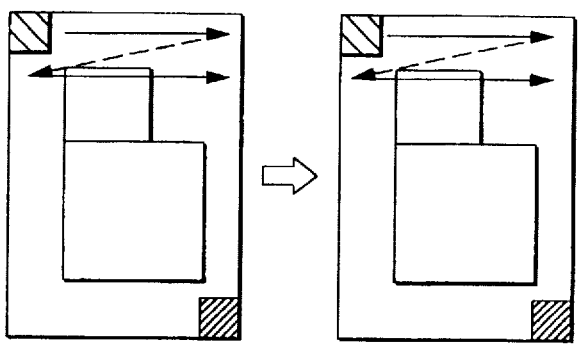
FIGS. 11A to 11D are illustration of examples of mirror image processing and rotation, an illustration with no rotation at the write time.
Figure 11B:
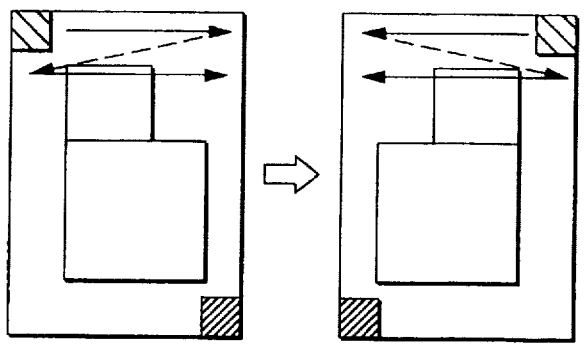
Figure 15A:
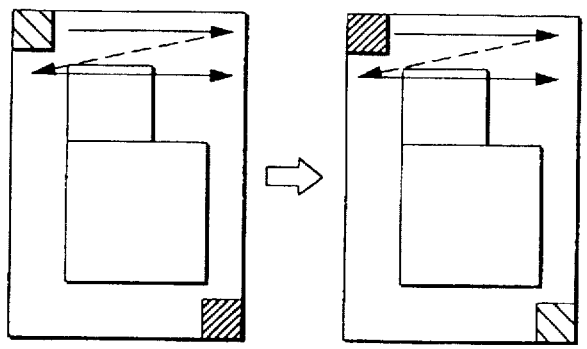
FIGS. 15A to 15D are illustration of examples of mirror image processing and rotation, an illustration with no rotation at the read time.
Figure 15B:
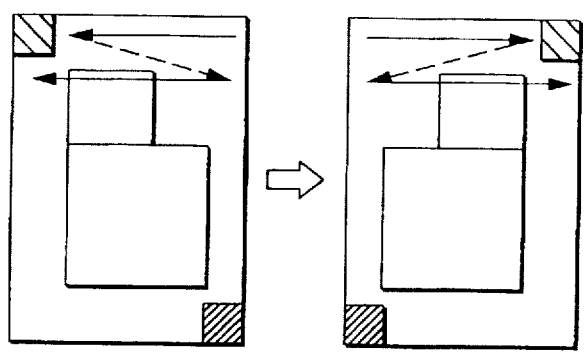

First, the horizontal direction mirror image processing is shown in FIGS. 11B and 15B. For the horizontal direction mirror image processing, the setup value XMIR is set to '1.' In the horizontal direction mirror image processing, the address conversion section 74 of the image memory access controller 22, 23 outputs the address of point B' in FIG. 9 as the destination initial address 95. The decoding section 73 outputs '0' as the count-up signal 92 and the address generation section 76 down counts with the D load address 102 as the initial value, whereby addresses in the opposite direction in the horizontal direction can be generated and the horizontal direction mirror image processing is enabled.

Figure 11C:
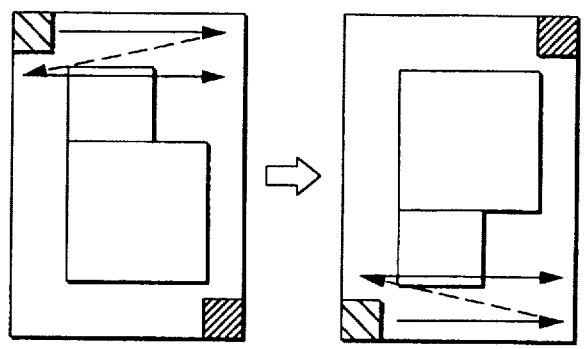
Figure 11D:
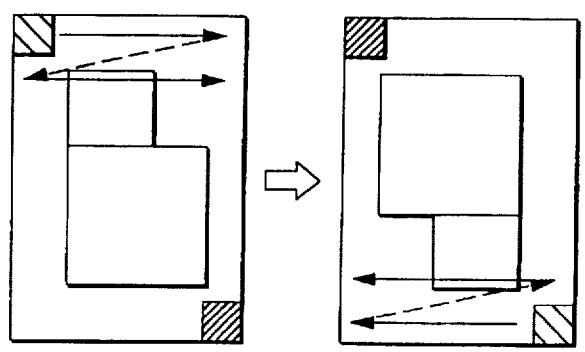
Figure 15C:
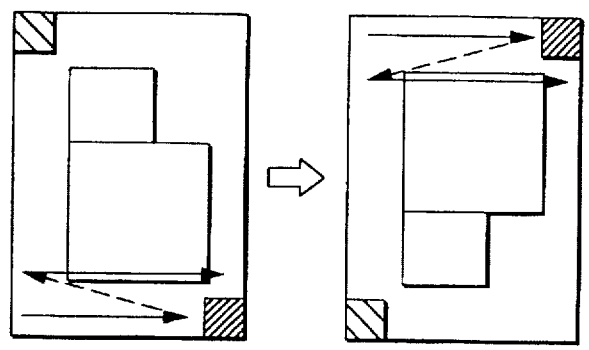
Figure 15D:
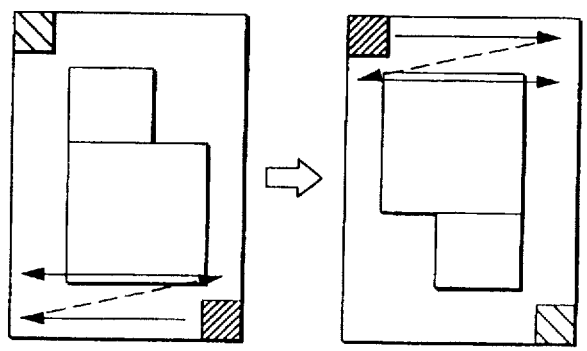
Figure 16A:
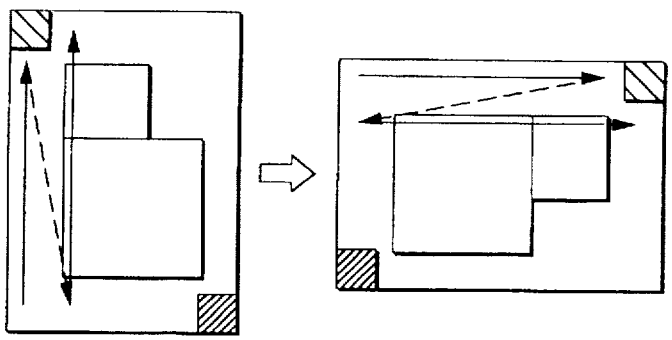
FIGS. 16A to 16D are illustration of examples of mirror image processing and rotation, an illustration for 90° rotation at the read time.
Figure 16B:
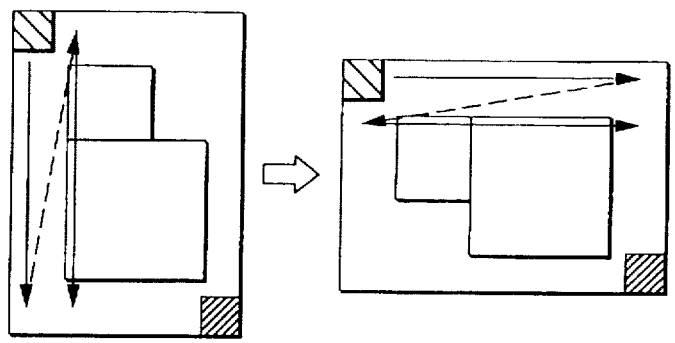
Figure 16C:
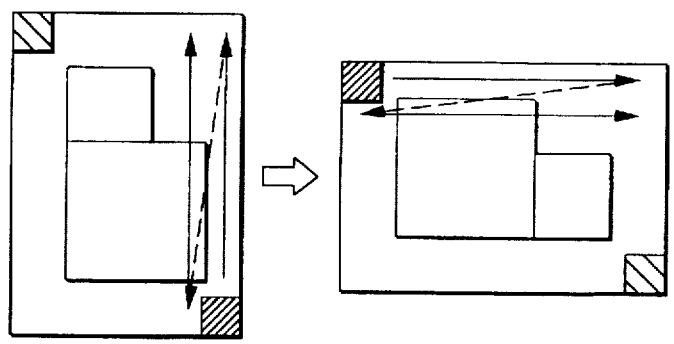
Figure 16D:
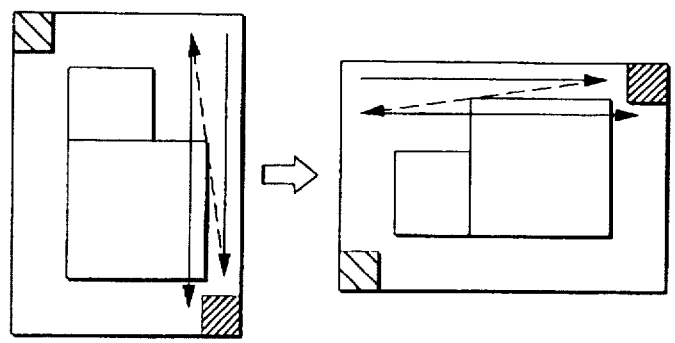
Figure 17A:
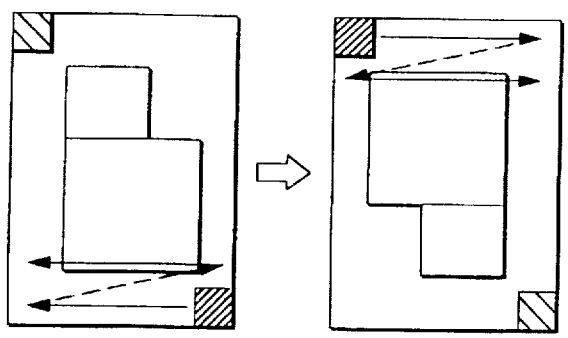
FIGS. 17A to 17D are illustration of examples of mirror image processing and rotation, an illustration for 180° rotation at the read time.
Figure 17B:
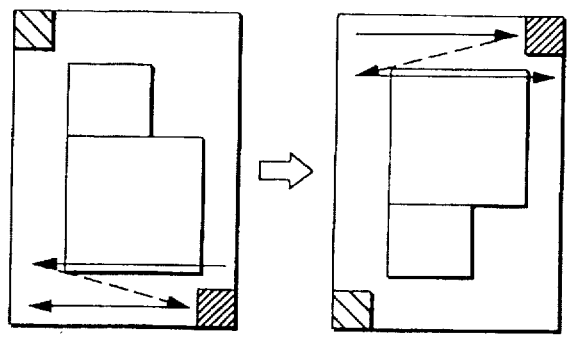
Figure 17C:
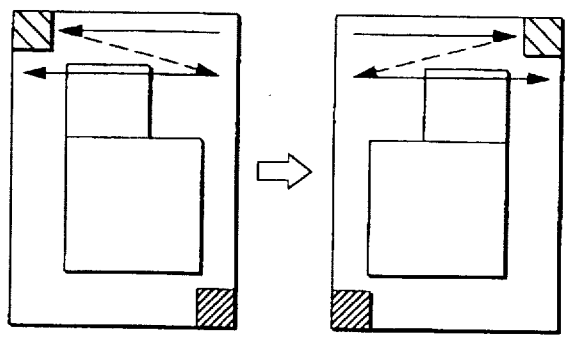
Figure 17D:
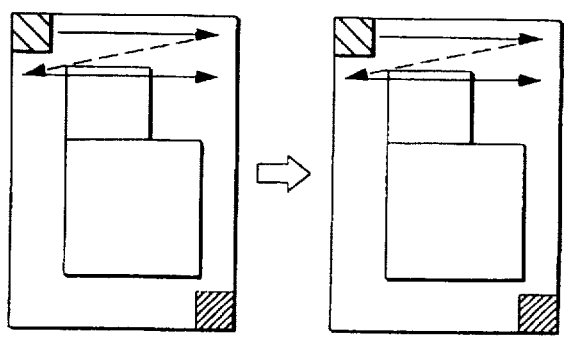
Figure 18A:
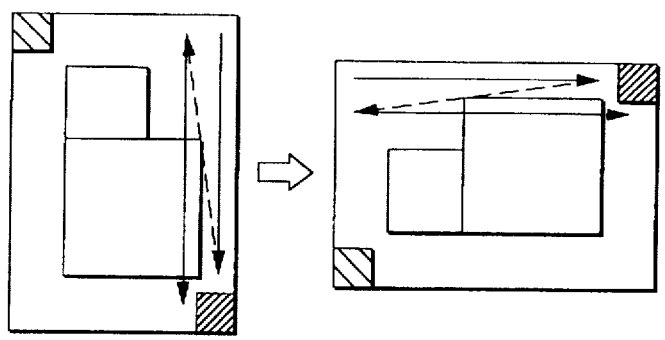
FIGS. 18A to 18D are illustration of examples of mirror image processing and rotation, an illustration for 27° rotation at the read time.
Figure 18B:
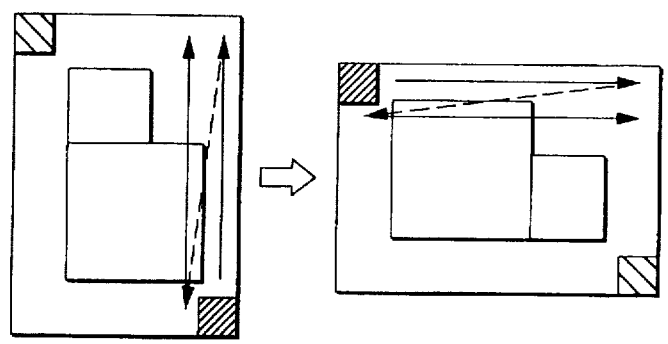
Figure 18C:
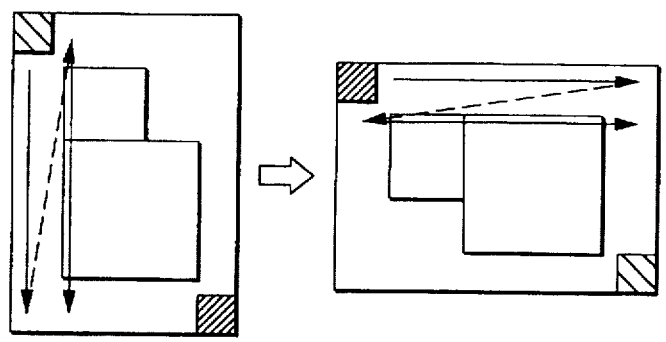
Figure 18D:
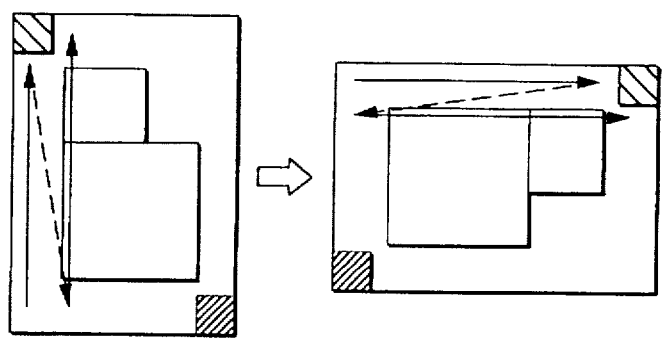

Next, the vertical direction mirror image processing is shown in FIGS. 11C and 15C. For the vertical direction mirror image processing, the setup value YMIR is set to '1.' In the vertical direction mirror image processing, the address conversion section 74 of the image memory access controller 22, 23 outputs the address of point C' in FIG. 9 as the destination initial address 95. The decoding section 73 outputs '0' as the vertical direction addition signal 94 and the load data generation section 75 subtracts the setup value FSW of the horizontal direction width of the image memory area each time 1-line processing terminates as the D load address 102. The operation is repeated until 1-page processing terminates, whereby the D load addresses 102 in the opposite direction in the vertical direction can be generated and the vertical direction mirror image processing is enabled.

The horizontal direction mirror image processing and the vertical direction mirror image processing can be combined. To do this, the setup values XMIR and YMIR are set to '1.' The address conversion section 74 of the image memory access controller 22, 23 outputs the address of point D' in FIG. 9 as the destination initial address 95. The decoding section 73 outputs '0' as the count-up signal 92 and '0' as the vertical direction addition signal 94. The load data generation section 75 subtracts the setup value FSW of the horizontal direction width of the image memory area each time 1-line processing terminates as the D load address 102, and outputs the subtraction result. The address generation section 76 down counts with the D load address 102 output from the load data generation section 75 as the initial value. The operation is repeated until 1-page processing terminates, whereby addresses in the opposite direction in both the vertical and horizontal directions can be generated and the horizontal direction mirror image processing and the vertical direction mirror image processing are enabled.

Figure 12A:
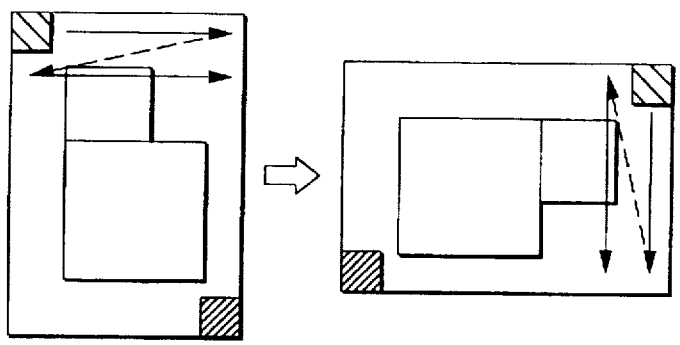
FIGS. 12A to 12D are illustration of examples of mirror image processing and rotation, an illustration for 90° rotation at the write time.
Figure 12B:
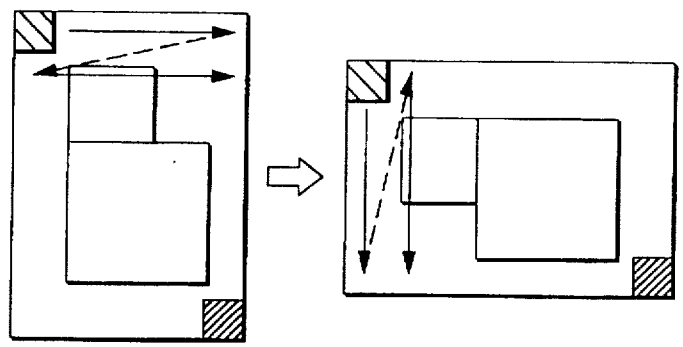
Figure 12C:
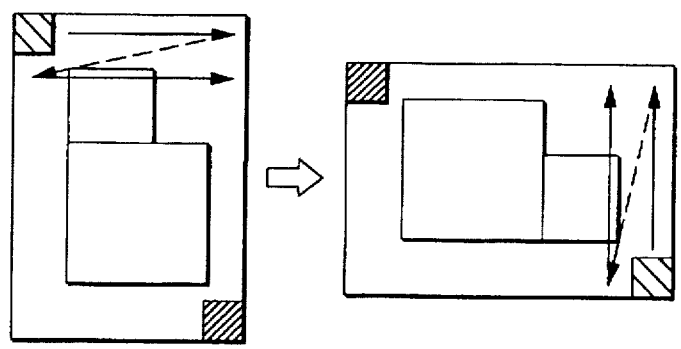
Figure 12D:
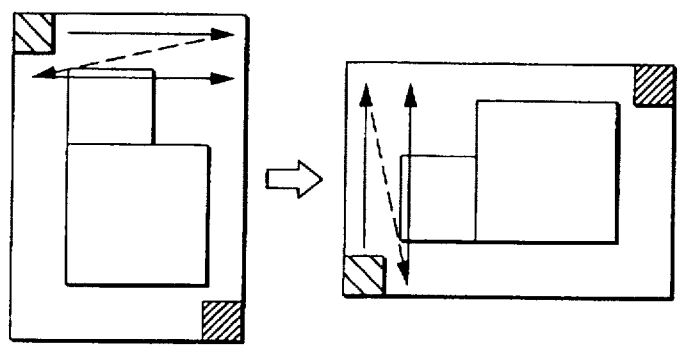

Next, the rotation will be discussed. For the rotation, the rotation angle is determined by the value of the setup value ROT. Here, 90°, 180°, and 270° rotations can be performed. The 90° rotation at the write time can be performed by writing data in the horizontal direction from right to left in the vertical direction, as shown in FIG. 12A.

The address conversion section 74 of the image memory access controller 22, 23 outputs the address of point B' in FIG. 9 as the destination initial address 95. The decoding section 73 outputs '0' as the addition address selection signal 93 and '0' as the vertical direction addition signal 94. In the load data generation section 75, the addition/subtraction value is set to one by the addition address selection signal 93 and subtraction is specified by the vertical direction addition signal 94, whereby the D load address 102 is decremented by one each time 1-line processing terminates.

Since the horizontal direction addition signal is '1' and the addition address selection signal is '0,' the address generation section 76 adds the setup value FSW of the horizontal direction width of the image memory area every reference clock cycle with the D load address 102 output from the load data generation section 75 as the initial value, and outputs the addition result as an internal address.

The 90° rotation at the write time is enabled by performing such processing of adding the setup value FSW every reference clock cycle while the horizontal direction reference signal is '1' with the value decremented by one for each line as the top address of the destination image area.

Figure 13A:
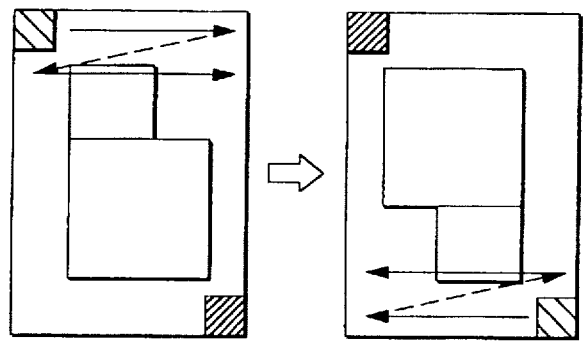
FIGS. 13A to 13D are illustration of examples of mirror image processing and rotation, an illustration for 180° rotation at the write time.
Figure 13B:
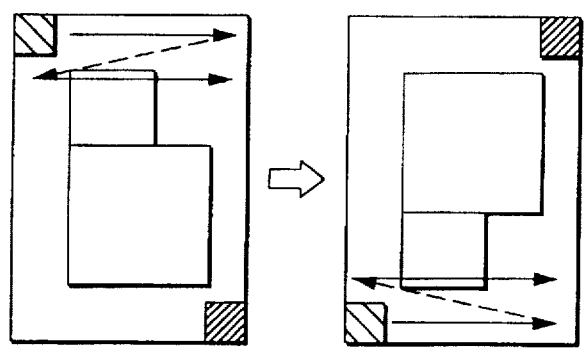
Figure 13C:
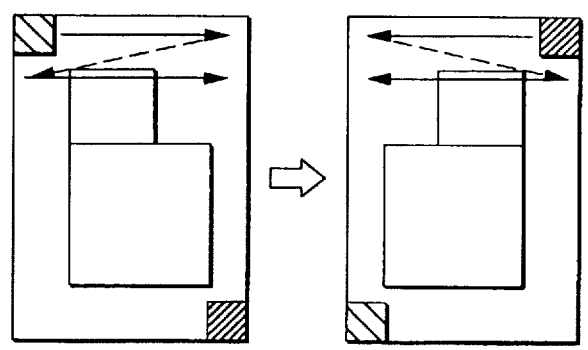
Figure 13D:
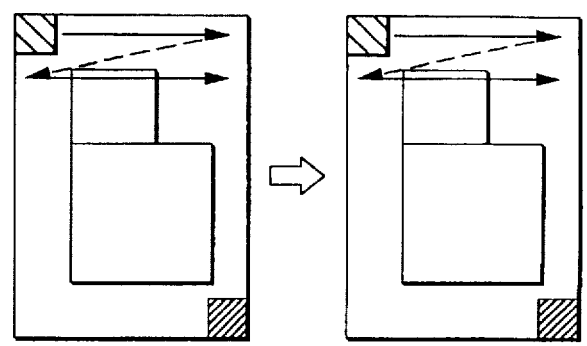

The 180° rotation at the write time may be performed by writing data from the opposite direction in both the horizontal and vertical directions, as shown in FIG. 13A. This is similar to the horizontal and vertical direction mirror image processing described above and can be carried out in a similar manner.

Figure 14A:
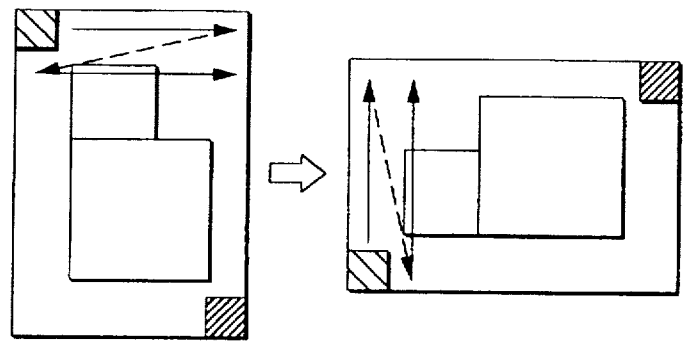
FIGS. 14A to 14D are illustration of examples of mirror image processing and rotation, an illustration for 270° rotation at the write time.
Figure 14B:
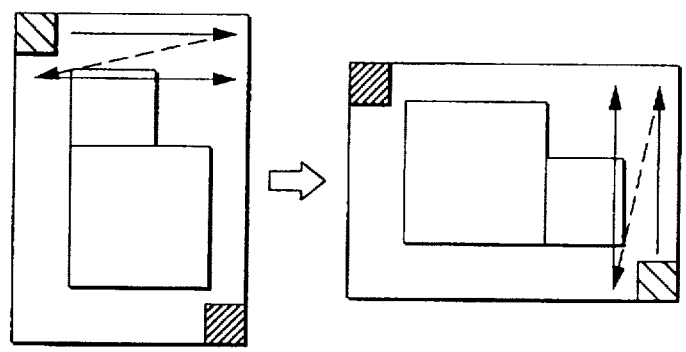
Figure 14C:
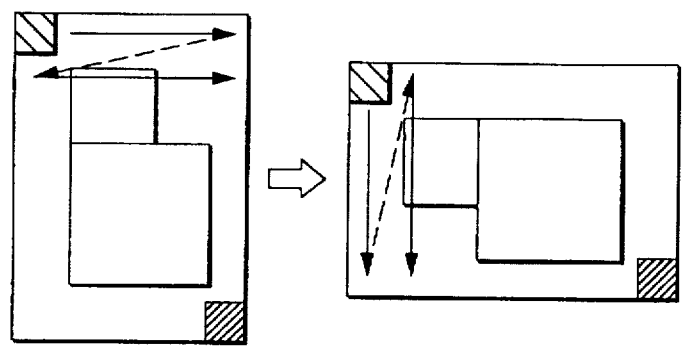
Figure 14D:
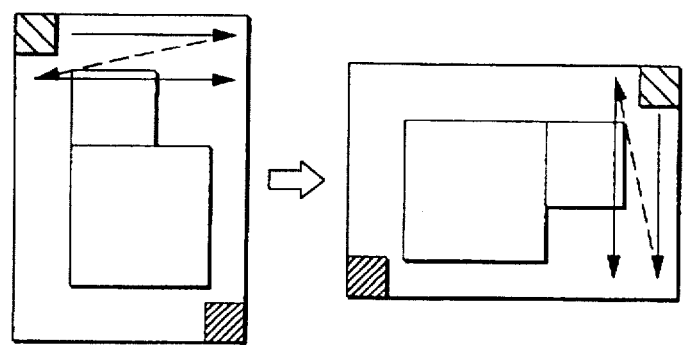

The 270° rotation at the write time can be performed by writing data in the horizontal direction from bottom to top and from left to right in the vertical direction, as shown in FIG. 14A.

The address conversion section 74 of the image memory access controller 22, 23 outputs the address of point C' in FIG. 9 as the destination initial address 95. The decoding section 73 outputs '0' as the addition address selection signal 93 and '0' as the vertical direction addition signal 94. In the load data generation section 75, the addition/subtraction value is set to one by the addition address selection signal 93 and addition is specified by the vertical direction addition signal 94, whereby the D load address 102 is incremented by one each time 1-line processing terminates.

Since the horizontal direction addition signal is '0' and the addition address selection signal is '0,' the address generation section 76 subtracts the setup value FSW of the horizontal direction width of the image memory area every reference clock cycle with the D load address 102 output from the load data generation section 75 as the initial value, and outputs the addition result as an internal address.

The 270° rotation at the write time is enabled by performing such processing of subtracting the setup value FSW every reference clock cycle while the horizontal direction reference signal is '1' with the value incremented by one for each line as the top address of the destination image area.

The 90°, 180°, and 270° rotations and horizontal direction mirror image processing, vertical direction mirror image processing, and horizontal and vertical direction mirror image processing can be combined for performing various types of conversion processing. FIGS. 11A to 14D show conversion processing at the write time that can be performed in combination. FIGS. 11A to 11D show the memory write operation with no rotation; FIGS. 12A to 12D show the memory write operation at 90° rotation; FIGS. 13A to 13D show the memory write operation at 180° rotation; and FIGS. 14A to 14D show the memory write operation at 270° rotation. In the figures, (A) shows application of no mirror image processing; (B) shows application of horizontal direction mirror image processing; (C) shows application of vertical direction mirror image processing; and (D) shows application of horizontal and vertical direction mirror image processing.

At the image memory read time like the write time, the address of the start point output to the destination initial address 95 and the values of the horizontal direction addition signal 91, the vertical direction addition signal 94, the count-up signal 92, and the addition address selection signal 93 output from the decoding section 73 can be combined for executing 90°, 180°, and 270° rotations, horizontal direction mirror image processing, vertical direction mirror image processing, and horizontal and vertical direction mirror image processing, and their combined conversion processing, as shown in FIGS. 15 to 18. FIG. 19 lists the values of the setup values RW, ROT, XMIR, and YMIR at the conversion processing time, the positions of the initial addresses output as the destination initial address 95, and figure numbers indicating the corresponding conversion processing.

5-3. Fast page mode cycle

The memory write operation in the fast page mode will be discussed. The fast page mode and the normal read/write cycle mode differ in how NRAS, NCASL, NCASH, and NWE signals are generated and data read/write from/into internal FIFO, and therefore only the differences will be discussed.

As in the read/write cycle mode, when the enable signal 64 and the horizontal direction area signal, vertical direction area signal are set to '1' and the control section 72 of the image memory access controller 22, 23 generates the reference clock signal 85, the horizontal direction reference synchronizing signal 82, vertical direction reference synchronizing signal 81, the access synchronizing signal 106 becomes the page mode WE signal 161 in the memory control signal generation circuit 143 of the image memory access section 77 in the image memory access controller 22, 23 and the page mode WE signal 161 is output.

In the fast page mode cycle, only column addresses are output in a given period after one row address for DRAM is output. Therefore, when a carry or borrow occurs in the row address, the fast page mode cycle needs to be once terminated, then again generated. Thus, when the address generation section 76 generates an internal address based on the D load address 102 from the load data generation section 75, it sets the page mode stop signal 104 for temporarily stopping the fast page mode cycle to '0' and outputs the signal to the memory control signal generation circuit 143 of the image memory access section 77 when the counter counts up to 3ff (h) or counts down to 400 (h).

The memory control signal generation circuit 143 generates the page mode WE signal 161, the page mode RAS signal 159, and the page mode CAS signal 160 by the access synchronizing signal 106, the reference clock signal 85, and the page mode stop signal 104, and outputs the signals to the control signal selection circuit 144. The page mode stop signal 104 is also output to the FIFO control circuit 172 in the data control circuit 145; when the page mode stop signal is '0,' it suppresses write of data into the internal FIFO. After this, as in the read/write cycle mode, the FIFO output data 185 is selected by the data selection circuit 173, is output onto the memory data bus 57, 58, and is written into the image memory 27, 28 in sequence. When the vertical direction reference synchronizing signal 81 is set to '0,' the operation terminates.

The differences between the memory write operation and the memory read operation in the fast page mode cycle are similar to those in the read/write cycle mode and therefore will not be discussed again. Since the memory is read at high speed in the fast page mode cycle, the operation of the external machine 12, 13 may be too late for the high-speed memory read. Even in such a case, temporarily read data is stored in the FIFO in the FIFO control circuit 172, so that the transfer rate can be adjusted.

In the second embodiment, the host computer 11 and the external machine 12, 13 are handled separately, but the host computer can also be connected via a data selector as an external machine. The number of the external machines is not limited to two and that of the image memories is not limited to two either. The number of the external machines and that of the image memories may not necessarily be the same. The image memory access controllers are provided in a one-to-one correspondence with the image memories. The data selectors are provided in a one-to-one correspondence with the external machines. If a small number of the data bus controllers are provided, the number of buses enabling parallel input/output is limited. Thus, the number of the data bus controllers may be matched with the number of the external machines or image memories.

FIG. 2 shows only one pair of the master and slave image memory access controllers. However, for example, an image processing apparatus for handling full-color images may be provided with four pairs of the controllers for C, M, Y, and K. Alternatively, three pairs of the controllers may be provided for R, G, and B. Further, more than one slave image memory access controller and more than one image memory may be provided corresponding to one master image memory access controller.

As seen in the description made so far, according to the invention, for example, when image data from the host computer is written into one image memory, data can be read from the other image memory and output to the external machine or the data read from the image memory can be output to more than one external machine. Further, when data is read from one image memory and output to the external machine, filling can be used to clear the other image memory or copying can be used to form a texture image. The memories can be used separately and moreover data can be input/output to/from the memories in parallel. Further, the image memory written into the image memory can be output to more than one external machine at the same time and the image data read through more than one external machine can be written into the image memory at the same time. Thus, the memory use efficiency is improved, the time taken for the print operation or the scan-in operation can be reduced drastically, and throughput degradation of the system operation can be avoided. When a large image, etc., requires a large memory capacity, a number of image memories can also be used as one image memory space and the image memory availability can be enhanced.

Preset values can be output when the area signal or the synchronizing signal from the image memory is inactive by the data bus controller. Thus, it is not necessary to clear the image memory each time data is written into the image memory; throughput degradation of the memory write operation can be avoided as much as possible.

Further, an image processing apparatus can be provided which can perform copying, verifying, filling etc., and conversion processing such as rotation, mirror image, and moving at the write or read time, can improve the whole throughput as compared with the case where separate processing is performed, and can perform efficient processing in a small configuration. According to the invention, various effects are produced in addition to the above-described effects.

What is claimed is:

1. An image processing apparatus connected to external machines for inputting data therefrom to a plurality of image memories and outputting data from said plurality of image memories thereto comprising:

a plurality of memory access controllers connected to said plurality of image memories;

control means for selecting; a first mode for said plurality of memory access controllers to access said image memories separately; or a second mode for a master controller, which is one of said memory access controllers, to access said plurality of image memories as one image memory space so as to control said plurality of memory access an area signal generator for outputting an area signal indicating that data on a data bus is valid based on a control signal input from the external machine.

2. The image processing apparatus of claim 1, wherein in the second mode, said master controller outputs a control signal to a slave controller, which is a memory access controller other than said master controller, for prohibiting said slave controller from accessing said image memory.

3. The image processing apparatus of claim 2, wherein said master controller and said slave controller adopt the same architecture.

4. The image processing apparatus of claim 1, further comprising:

data selectors provided in a one-to-one correspondence with the external machines for controlling data input/output, wherein said memory access controllers operate based on the area signal output from said signal generator.

5. The image processing apparatus of claim 4, further comprising:

data bus controllers for controlling data input/output from/to said data selector and said image memory access controllers.

6. The image processing apparatus of claim 5, wherein as many data bus controllers as the number of connected external machines or the number of said image memories, whichever is the greater, are provided.

7. The image processing apparatus of claim 5, wherein said data bus controller is capable to output data input from said one external machine to said plurality of memory access controllers.

8. The image processing apparatus of claim 5, wherein said data bus controller is capable to transfer data from said memory access controller to one or more different memory access controllers.

9. The image processing apparatus of claim 5, wherein said control means controls sections based on instructions from a host computer, and said data bus controller also controls data input/output from/to said host computer.

10. The image processing apparatus of claim 5, wherein said data bus controller inputs/outputs a predetermined invalid data value in a period in which data on said data bus is invalid.

11. The image processing apparatus of claim 4, wherein said memory access controller executes address conversion based on the area signal output from said area signal generator and given access position information, and reads/writes data from/into said image memory.

12. The image processing apparatus of claim 11, wherein said memory access controller executes image conversion processing by the address conversion.

13. The image processing apparatus of claim 4, wherein said data selector is capable to select any data read from said plurality of image memories, and wherein said several data selectors select data read from one image memory for outputting to said external machines.

14. The image processing apparatus of claim 4, wherein said memory access controller has a mode for accessing said image memory in synchronization with a new synchronizing signal even if the area signal output from said area signal generator is invalid.

15. The image processing apparatus of claim 4, wherein said memory access controller has a fast page access mode as well as a normal access mode.

16. The image processing apparatus of claim 4, wherein said memory access controller contains an FIFO, and is capable to set a write timing of data into said FIFO.

* * * * *